# (12) United States Patent
Imaeda et al.

(10) Patent No.: US 8,464,203 B2
(45) Date of Patent: Jun. 11, 2013

(54) SYSTEM AND PROGRAM PRODUCT FOR EXECUTING PROGRAM TO THEREBY TEST THE PROGRAM

(75) Inventors: Kouji Imaeda, Nagoya (JP); Tadaharu Nishimura, Oobu (JP)

(73) Assignee: Denso Corporation, Kariya ( * ) Notice: Subject to any disclaimer, the term of this patent is extended or adjusted under 35 U.S.C. 154(b) by 951 days.

(21) Appl. No.: 12/260,223

(22) Filed: Oct. 29, 2008

(65) Prior Publication Data
US 2009/0125889 A1 May 14, 2009

(30) Foreign Application Priority Data
Nov. 9, 2007 (JP) ................................. 2007-292154

(51) Int. Cl.
*G06F 9/44* (2006.01)
(52) U.S. Cl.
USPC ........................................................ 717/100
(58) Field of Classification Search
None
See application file for complete search history.

(56) References Cited

U.S. PATENT DOCUMENTS

| | | | | |
|---|---|---|---|---|
| 3,707,725 A * | 12/1972 | Dellheim | ..................... | 714/38.12 |
| 3,761,893 A * | 9/1973 | Morley | ......................... | 711/151 |
| 4,432,051 A * | 2/1984 | Bogaert et al. | ................. | 717/127 |
| 5,533,170 A * | 7/1996 | Teitzel et al. | ................... | 358/1.8 |
| 5,594,905 A * | 1/1997 | Mital | ............................ | 710/260 |
| 5,887,175 A * | 3/1999 | Col et al. | ....................... | 710/260 |
| 6,247,171 B1 * | 6/2001 | Yellin et al. | .................... | 717/126 |
| 6,345,387 B1 | 2/2002 | Morrison | | |
| 7,120,572 B1 * | 10/2006 | Liang | .............................. | 703/26 |
| 7,168,065 B1 * | 1/2007 | Naccache et al. | ............. | 717/127 |
| 7,191,430 B2 * | 3/2007 | Karp et al. | ...................... | 717/129 |
| 7,392,431 B2 * | 6/2008 | Swoboda | ......................... | 714/28 |
| 7,433,803 B2 * | 10/2008 | Circello et al. | ............... | 702/186 |
| 7,735,067 B1 * | 6/2010 | Leventhal | ...................... | 717/128 |
| 2003/0066054 A1 * | 4/2003 | Aarts et al. | ..................... | 717/129 |
| 2004/0088462 A1 * | 5/2004 | Miyake et al. | ................. | 710/261 |
| 2006/0123172 A1 * | 6/2006 | Herrell et al. | .................. | 710/269 |
| 2006/0136876 A1 * | 6/2006 | Melamed et al. | ............. | 717/124 |
| 2006/0150140 A1 * | 7/2006 | Elvanoglu et al. | ............ | 717/104 |
| 2006/0242517 A1 | 10/2006 | Pedley et al. | | |
| 2006/0248410 A1 * | 11/2006 | Circello et al. | .................. | 714/47 |

(Continued)

FOREIGN PATENT DOCUMENTS

| | | |
|---|---|---|
| JP | 2-84952 | 7/1990 |
| JP | 6-004346 | 1/1994 |

(Continued)

OTHER PUBLICATIONS

European Search Report dated Feb. 9, 2011, issued in corresponding European Application No. 08016145.8—1225.

(Continued)

*Primary Examiner* — Wei Zhen
*Assistant Examiner* — Adam R Banes
(74) *Attorney, Agent, or Firm* — Nixon & Vanderhye PC

(57) ABSTRACT

In a system for carrying out a program to be tested, an interrupt generator is provided; this program includes a plurality of routines designed to be called and executed in a predetermined order. The interrupt generator generates an interrupt request every time one of the plurality of routines is called. A determining unit is provided in the system. The determining unit determines whether a sequence of instructions in the program is normal based on historical information indicative of whether the interrupt request corresponding to at least one of the plurality of routines is generated.

9 Claims, 26 Drawing Sheets

U.S. PATENT DOCUMENTS

| | | | | |
|---|---|---|---|---|
| 2006/0253691 | A1* | 11/2006 | Barraclough et al. | 712/244 |
| 2007/0006168 | A1* | 1/2007 | Dimpsey et al. | 717/130 |
| 2007/0028216 | A1* | 2/2007 | Boss et al. | 717/124 |
| 2007/0277155 | A1* | 11/2007 | Casey | 717/124 |

FOREIGN PATENT DOCUMENTS

| | | |
|---|---|---|
| JP | 8-161195 | 6/1996 |
| JP | 11-306045 | 11/1999 |
| JP | 2001-084161 | 3/2001 |
| JP | 2004-318672 | 11/2004 |

OTHER PUBLICATIONS

Kopetz, "Error detection", "Design Principles for Distributed Embedded Applications", Chapter 10, Real-Time Operating Systems, Kluwer Academic Publishers, 1997, pp. 219-220.

Murphy "Watchdog timers", Internet citation http://www.eetindia.com.in/STATIC/PDF/2/00011/EEIOL, Nov. 2000, pp. 1-5.

Office Action (5 pgs.) dated Sep. 9, 2009 issued in corresponding Japanese Application No. 2007-292154 with translation (4 pgs.).

Partial European Search Report dated Aug. 31, 2010 for corresponding European Application No. 08016145.8—1225.

Arora et al, "Secure Embedded Processing through Hardware-assisted Run-time Monitoring", Proceedings of the Design, Automation and Test in Europe Conference and Exhibition, Mar. 2005, pp. 178-183.

Leaphart, et al, "Survey of Software Failsafe Techniques for Safety-Critical Automotive Applications", SAE Technical Paper Series, SAE International, Apr. 2005, pp. 1-16.

Plattner, et al, "Monitoring Program Execution: A Survey", Computer, IEEE Service Center, vol. 14, No. 11, Jan. 1982, pp. 76-93.

Costella, et al, "An Instrument for Concurrent Program Flow Monitoring in Microprocessor Based Systems", Proceedings of the Instrumentation and Measurement Technology Conference, IEEE, May 1992, pp. 169-172.

Chodrow et al, "The Sentry System", Reliable Distributed Systems, Proceedings, $11^{th}$ Symposium on Houston, TX, IEEE, Oct. 1992, pp. 230-237.

Rabéjac, et al, "Executable Assertions and Timed Traces for On-Line Software Error Detection", Proceedings of the $26^{th}$ International Symposium on Fault-Tolerant Computing, IEEE, Jun. 1996, pp. 138-147.

Noubir et al, "Algebraic Techniques for the Optimization of Control Flow Checking", Proceedings of the $26^{th}$ International Symposium on Fault-Tolerant Computing, IEEE, Jun. 1996, pp. 128-137.

* cited by examiner

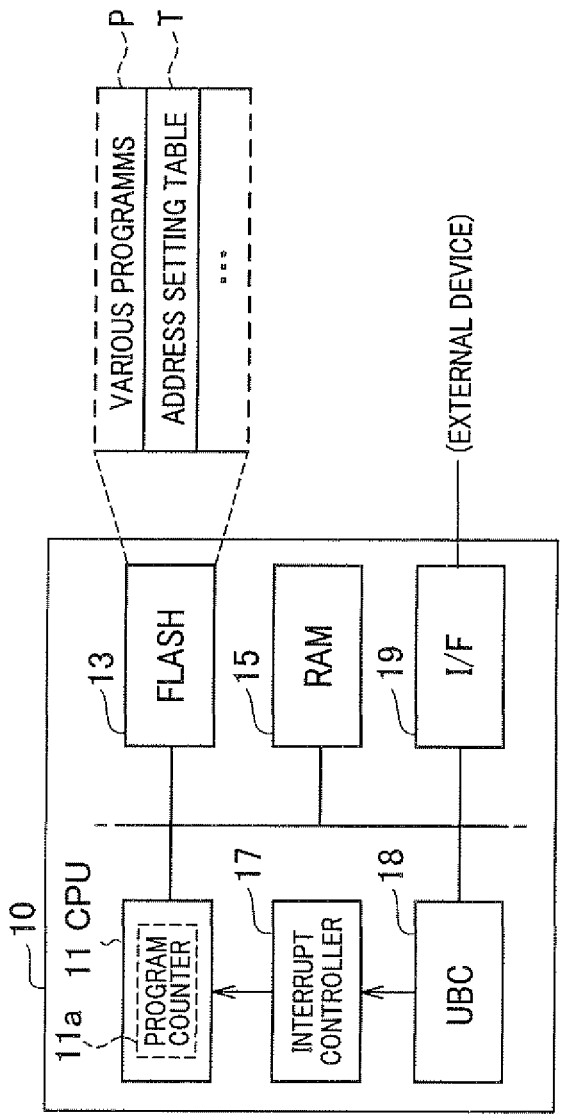
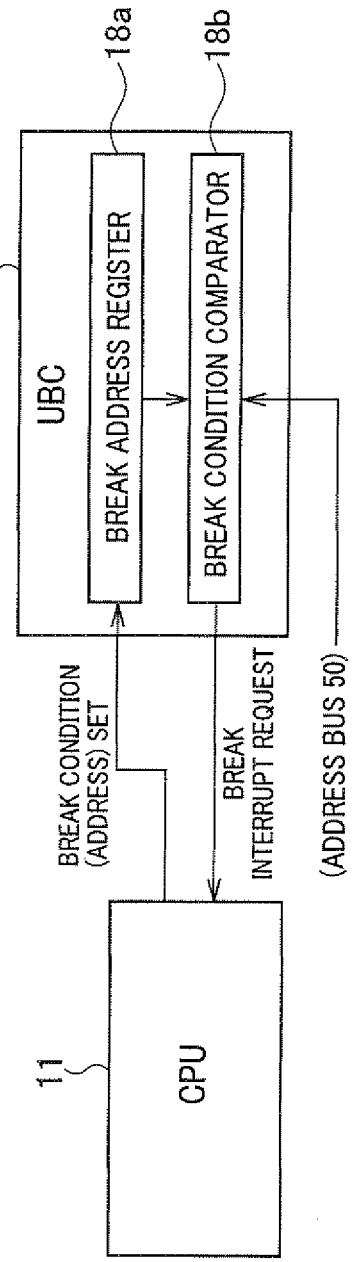

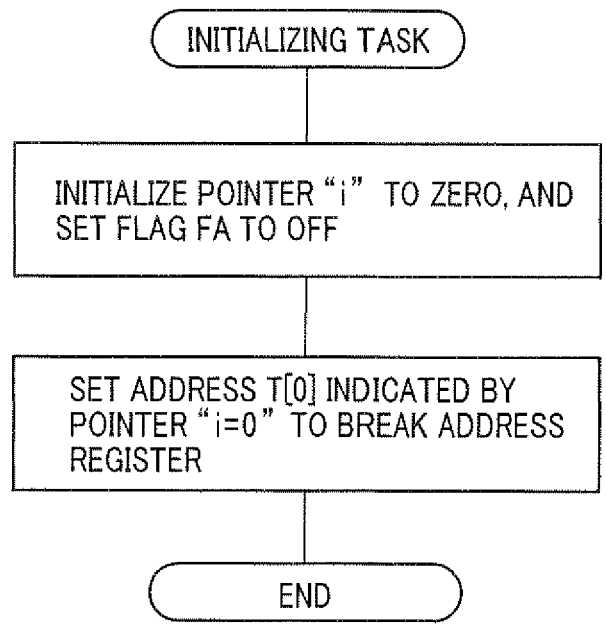

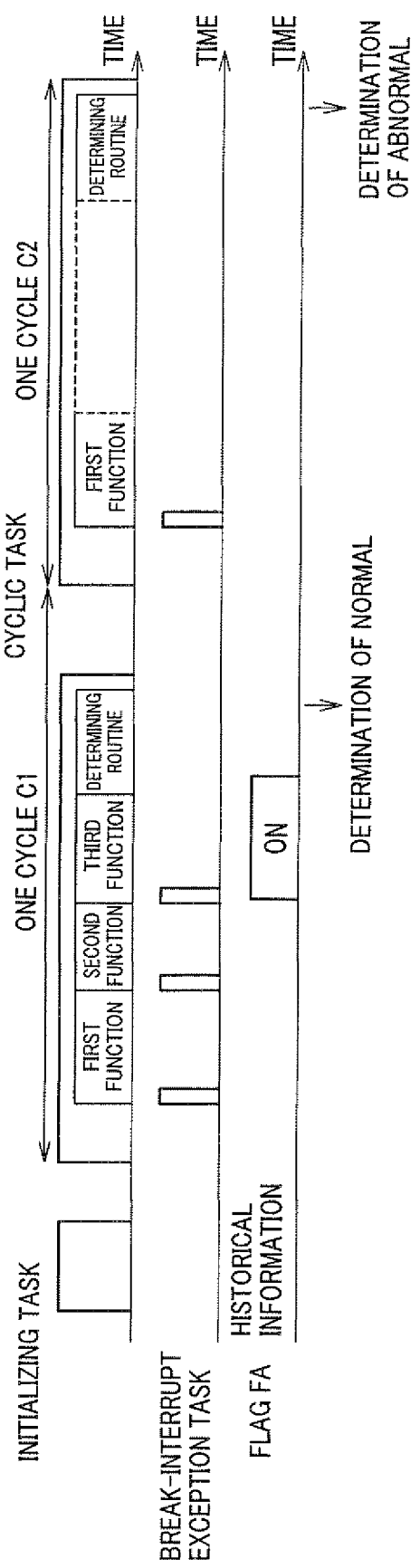

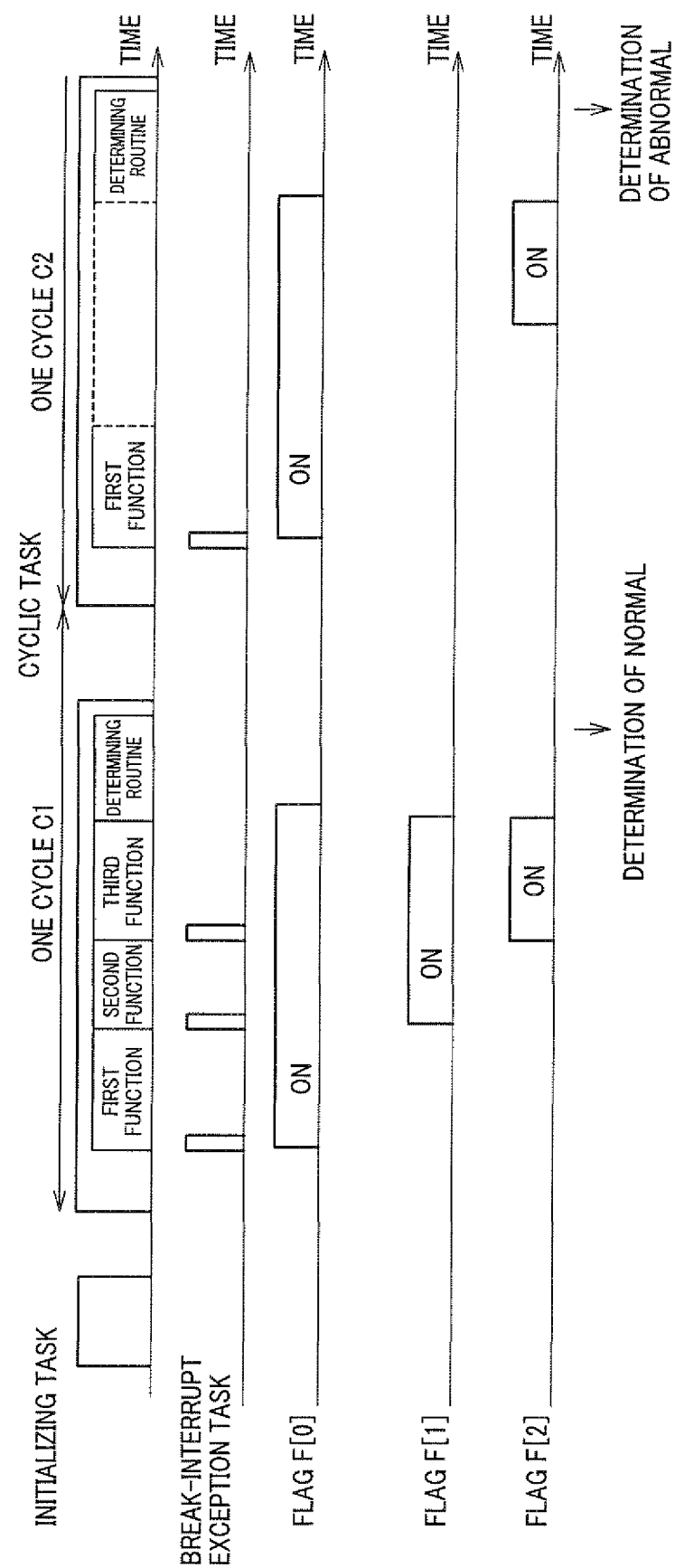

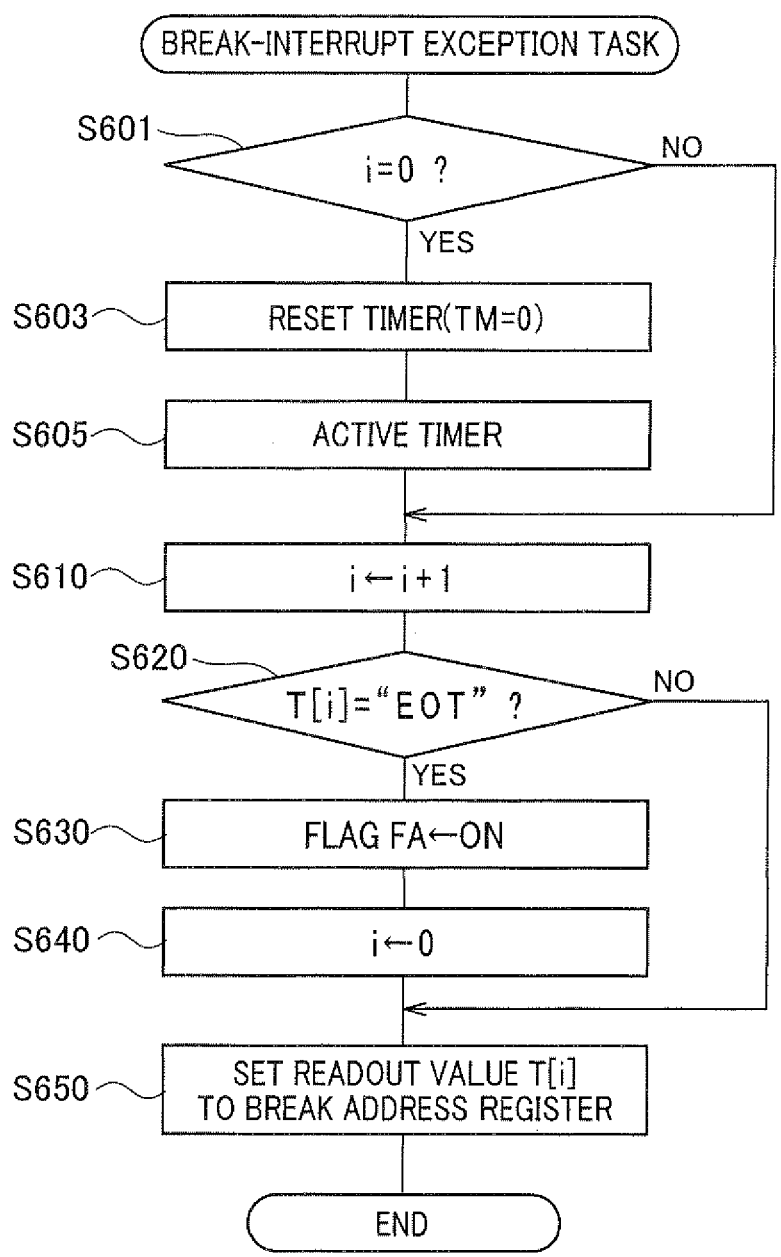

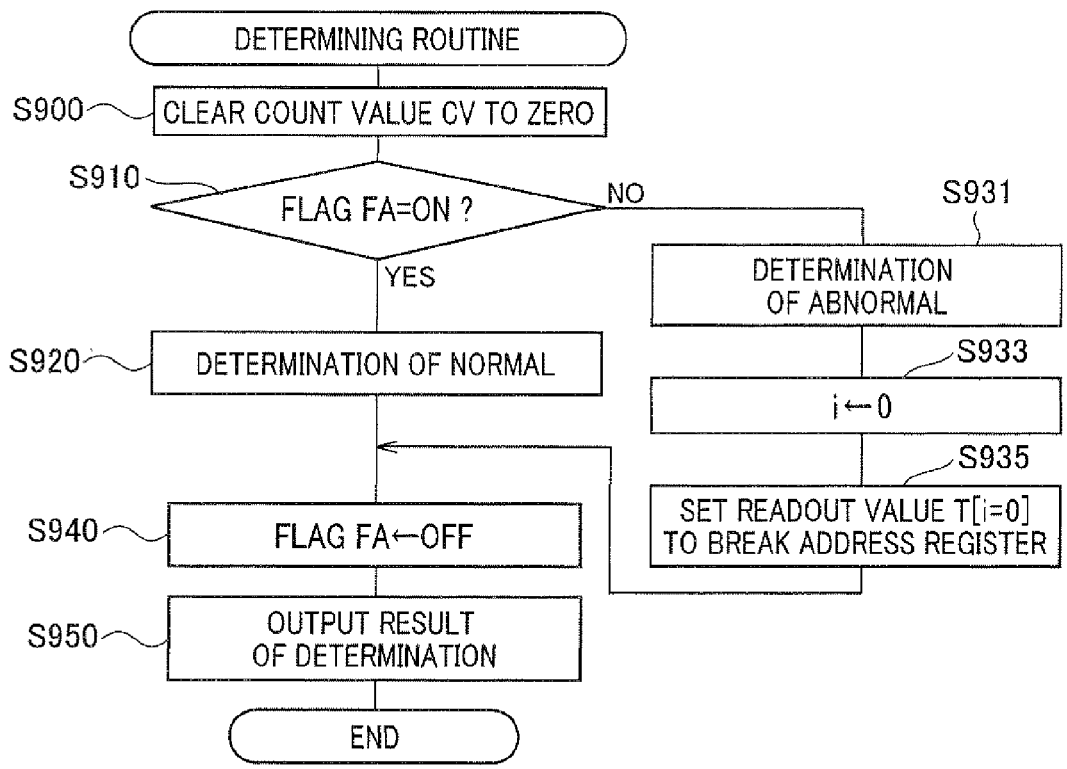
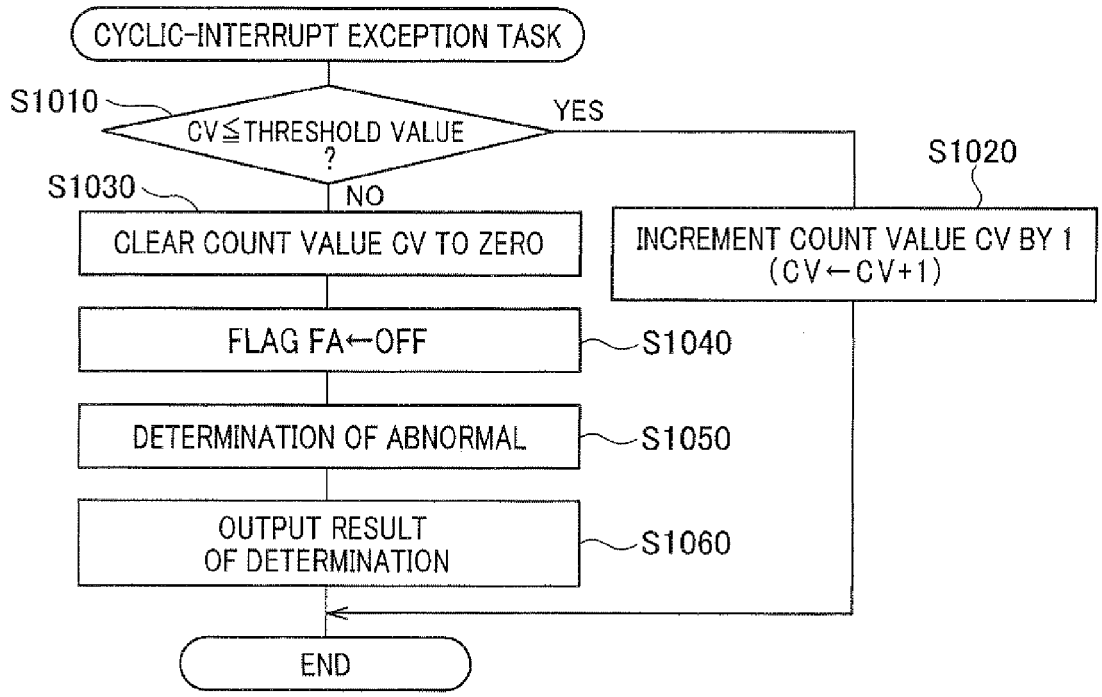

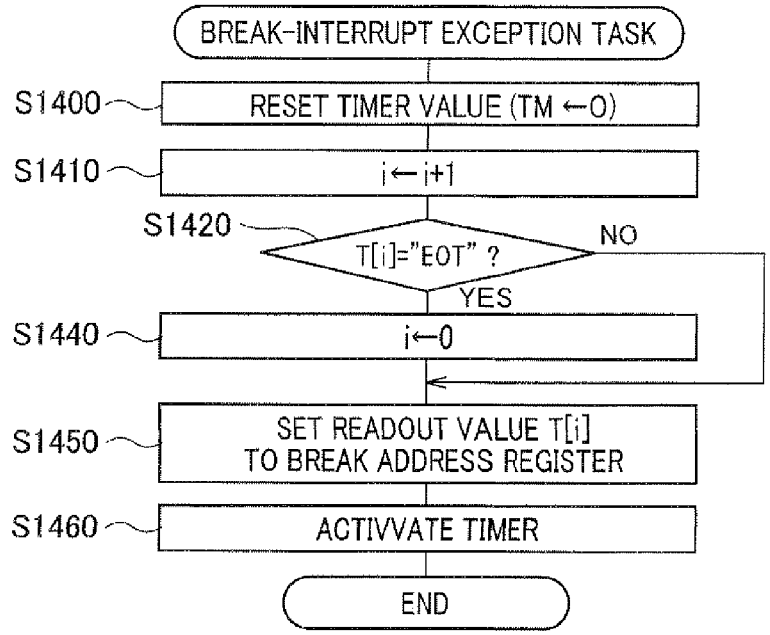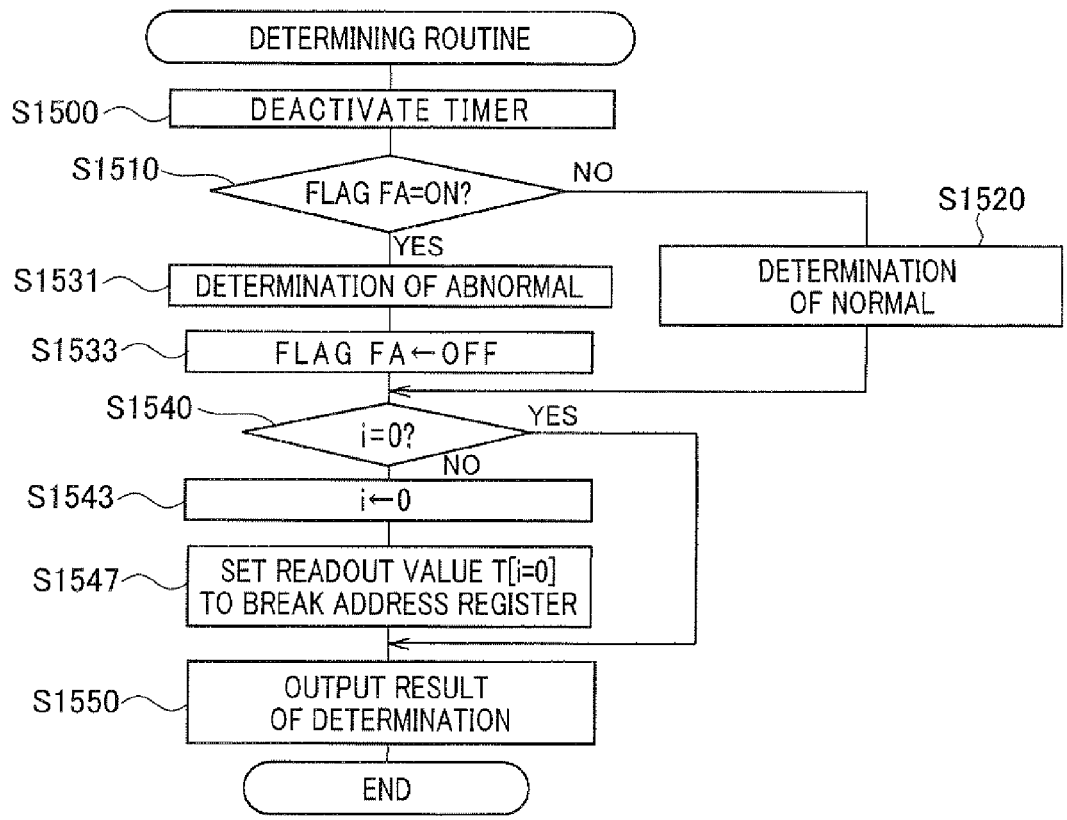

SYSTEM AND PROGRAM PRODUCT FOR EXECUTING PROGRAM TO THEREBY TEST THE PROGRAM

CROSS REFERENCE TO RELATED APPLICATION

This application is based on Japanese Patent Application 2007-292154 filed on Nov. 9, 2007. This application aims at the benefit of priority from the Japanese Patent Application, so that the descriptions of which are all incorporated herein by reference.

BACKGROUND OF THE INVENTION

1. Field of the Invention

The present invention relates to systems and program products for testing whether the sequence of instructions in a program is normal.

2. Description of the Related Art

In debugging for a program designed to a designer, breakpoints are planted in the program. The breakpoints mean points in the program at which execution is to be suspended so that examination of partial results is possible.

Specifically, execution of the program is stopped when a breakpoint is reached, and the values stored in variables of the program at the breakpoint are examined. Such debugging is disclosed in Japanese Patent Application Publication No. H06-4346.

SUMMARY OF THE INVENTION

As methods of testing whether the sequence of instructions in a program is normal or not, there is a method of checking whether a plurality of functions in a program are executed in a designed order based on a count value that can be incremented in each of the functions.

FIGS. 24A to 24C schematically illustrate the check method set forth above in the form of a flow chart to be executed by a CPU.

In the check method, note that a program to be tested is designed such that the first function and the second function are executed in this order. The number of functions is not limited to the two.

The program is also designed to include an instruction of initializing a count value CN to "1"; this initializing instruction is located in the program before the first function. The program is further designed to include a routine of determining whether the sequence of instructions therein is normal based on the count value CN; this determining routine is located in the program after the second function.

When reaching the initializing instruction (step S2110 of FIG. 24A) during running of the program, the CPU executes the initializing instruction to thereby initialize the count value CN to "1" in step S2110, and thereafter, the CPU executes the first function in step S2120.

Next, after executing the second function in step S2130, the CPU executes the determining routine in step S2140.

In the program to be tested, each of the first and second functions is designed in the form of a flow chart illustrated in FIG. 24B.

Specifically, at a predetermined point in each of the first and second functions, the CPU determines whether the count value CN is matched with the ordinal position "i" of a corresponding one of the functions (see step S2210 in FIG. 24B).

For example, in step S2210 of the first function, the CPU determines whether the count value CN is matched with the ordinal position "i=1".

When it is determined that the count value CN is matched with the ordinal position "i" of a corresponding one of the functions (YES in step S2210), the CPU increments the count value CN by 1 in step S2220, and otherwise, sets the count value CN to an error value of "0xFF" in hexadecimal in step S2230.

For example, when the second function is erroneously carried out before execution of the first function, the count value CN to which "1" has been initialized in step S2110 is mismatched with the ordinal position "i=2" of the second function (NO in step S2210). Thus, the error value of "0xFF" in hexadecimal is set to the count value CN in step S2230.

After execution of the second function, in the determination routine in step S2140, the CPU determines whether the count value CN is equal to "3" in step S2310.

Upon determining that the count value CN is equal to "3" (YES in step S2310), the CPU determines that the first function and the second function are normally executed in this order (designed order) in step S2320.

Otherwise, upon determining that the count value CN is different from "3" (NO in step S2310), the CPU determines that the first function and the second function are abnormally executed in step S2330.

Then, the CPU outputs a result of the determination in step S2320 or S2330, exiting the determination routine in step S2140.

Design of the program to be tested in accordance with the flowcharts illustrated in FIGS. 24A to 24C sets the count value CN to the error value of "0xFF" in hexadecimal during execution of the second function when no first function is executed due to a program design flaw. The error value of "0xFF" in hexadecimal set to the count value CN allows the CPU to determine that the sequence of instructions in the program is abnormal.

As another example, when no second function is carried out after execution of the first function, in the determination routine in step S2140, the CPU determines whether the count value CN is equal to "3" in step S2310.

In the determination in step S2310, the count value CN is incremented to become "2" during execution of the first function, and it is kept unchanged because no second function is executed after execution of the first function. For this reason, the CPU determines that the count value CN is not equal to "3" (NO in step S2310). Thus, the CPU determines that the first function and the second function are abnormally executed in step S2330 to thereby determine that the sequence of instructions in the program is abnormal.

As described above, the check method comprises the steps of:

designing that each of the first and second functions in a program to be tested includes the instructions in steps S2210, S2220, and S2230;

adding the initializing instruction in step S2110 in the program before execution of the first function; and adding the determining instruction in step S2140 in the program after execution of the second function.

In the configuration of the check method, when the program is changed in design so that a third function is added in the program to be tested between the first function and the second function, the instruction in step S2210 of each function and that in step S2310 of the determining routine are required to be changed. In other words, if no change is applied to either the instruction in step S2210 of each function or that in step S2310 of the determining routine, it would be difficult to accurately check the program.

Specifically, the check method set forth above requires program designers and/or program developers to fix each function in a program to be tested every time a function is added to the program or deleted therefrom. This may increase the time and effort required to check whether the sequence of instructions in a program to be tested is normal.

In view of the background, an object of at least one aspect of the present invention is to provide systems and programs capable of reducing the time and/or effort required to test whether the sequence of instructions in a program is normal, as compared with the check method set forth above.

According to a first aspect of the present invention, there is provided a system for executing a program to thereby test the program. The program includes a plurality of routines designed to be called and executed in a predetermined order. The system includes an interrupt generator configured to generate an interrupt request every time one of the plurality of routines is called. The system includes a determining unit configured to determine whether a sequence of instructions in the program is normal based on historical information indicative of whether the interrupt request corresponding to at least one of the plurality of routines is generated.

According to a second aspect of the present invention, there is provided a system for executing a program to thereby test the program. The program includes a plurality of routines designed to be called and executed in a predetermined order. The system includes an interrupt generator configured to generate an interrupt request every time one of the plurality of routines is called. The system includes a measuring unit configured to measure an elapsed time since a timing defined by generation of the interrupt request corresponding to one of the plurality of routines being called. The system includes a determining unit configured to, when the measured elapsed time corresponding to one of the plurality of routines exceeds a preset threshold value, determine that an alternative one of the plurality of routines next to the one of the plurality of routines in the predetermined order is not carried out.

According to a third aspect of the present invention, there is provided a program product embedded in a media accessible by a computer of a system for executing a program to thereby test the program. The program includes a plurality of routines designed to be called and executed in a predetermined order. The program product includes first means for instructing the computer to, when an interrupt request is generated every time one of the plurality of routines is called, receive the generated interrupt request. The program product includes second means for instructing the computer to determine whether a sequence of instructions in the program is normal based on historical information indicative of whether the interrupt request corresponding to at least one of the plurality of routines is generated.

According to a fourth aspect of the present invention, there is provided a program product embedded in a media accessible by a computer of a system for carrying out a program to thereby test the program. The program includes a plurality of routines designed to be called and executed in a predetermined order. The program product includes first means for instructing the computer to, when an interrupt request is generated every time one of the plurality of routines is called, receive the generated interrupt request. The program product includes second means for instructing the computer to measure an elapsed time since a timing defined by receipt of the interrupt request corresponding to one of the plurality of routines being called. The program product includes third means for instructing the computer to, when the measured elapsed time corresponding to one of the plurality of routines exceeds a preset threshold value, determine that an alternative one of the plurality of routines next to the one of the plurality of routines in the predetermined order is not carried out.

In the first aspect of the present invention, an interrupt request is generated by the interrupt generator every time one of the plurality of routines is called. Similarly, in the third aspect of the present invention, when an interrupt request is generated every time one of the plurality of routines is called, the generated interrupt request is received by the computer instructed by the first means.

In the first and third aspects of the present invention, it is determined whether the sequence of the instructions in the program is normal based on the historical information indicative of whether the interrupt request corresponding to at least one of the plurality of routines is generated (received).

Specifically, when the historical information represents that no interrupt request corresponding to at least one of the plurality of routines is generated, it is possible to determine that the sequence of the instructions in the program is not normal based on the historical information.

In the second aspect of the present invention, an interrupt request is generated by the interrupt generator every time one of the plurality of routines is called. Similarly, in the fourth aspect of the present invention, when an interrupt request is generated every time one of the plurality of routines is called, the generated interrupt request is received by the computer instructed by the first means.

In the second and fourth aspects, an elapsed time since generation (receipt) of the interrupt request corresponding to one of the plurality of routines being called is measured by the measuring unit or the computer instructed by the second means.

When the measured elapsed time corresponding to one of the plurality of routines exceeds the preset threshold value, it is determined that an alternative one of the plurality of routines next to the one of the plurality of routines in the predetermined order is not carried out. Thus, an alternative task, such as a failsafe task, corresponding to the alternative one of the plurality of routines can be executed.

Specifically, in the second and fourth aspects of the present invention, even if an alternative one of the plurality of routines next to one of the plurality of routines is not carried out upon the measured elapsed time corresponding to one of the plurality of routines exceeding the preset threshold value, it is possible to detect the abnormality in the alternative one of the plurality of routines. This allows execution of the alternative task corresponding to the abnormal routine, making it possible to increase the reliability of the system.

Note that, in the first to fourth aspects of the present invention, "routine" means a piece of a program, such as "subroutine" designed as a sequence of instructions for performing a particular task, "function" defined as a program unit that given values for input parameters computes a value, or the like

BRIEF DESCRIPTION OF THE DRAWINGS

Other objects and aspects of the invention will become apparent from the following description of embodiments with reference to the accompanying drawings in which:

FIG. 1A is a block diagram schematically illustrating an example of the overall structure of a microcomputer according to a first embodiment of the present invention;

FIG. 1B is a block diagram schematically illustrating an example of the structure of a user break controller illustrated in FIG. 1A according to the first embodiment;

FIG. 2 is a view schematically illustrating an address setting table stored in a flash memory illustrated in FIG. 1A according to the first embodiment;

FIG. 3 is a flow chart schematically illustrating an initializing task to be executed by a CPU illustrated in FIG. 1A according to the first embodiment;

FIG. 6A is a timing chart schematically illustrating a relationship between an execution timing of each function in a target program to be tested, an execution timing of each break-interrupt exception task, and a value of a flag set in the CPU according to the first embodiment;

FIG. 6B is a timing chart schematically illustrating a relationship between the execution timing of each function in the target program, the execution timing of each break-interrupt exception task, and a value of a flag for each function set in the CPU according to a modification of the first embodiment;

FIG. 11 a flow chart schematically illustrating a break-interrupt exception task to be executed by the CPU according to the third embodiment;

FIG. 16B is a flow chart schematically illustrating a determining routine to be executed by the CPU according to the fourth embodiment;

FIG. 16C is a flow chart schematically illustrating the cyclic-interrupt exception task to be executed by the CPU according to the fourth embodiment;

FIG. 21A is a flow chart schematically illustrating a break-interrupt exception task to be executed by the CPU according to the sixth embodiment;

FIG. 21B is a flow chart schematically illustrating a determining routine to be executed by the CPU according to the sixth embodiment;

DETAILED DESCRIPTION OF EMBODIMENTS OF THE INVENTION

Figure 4:
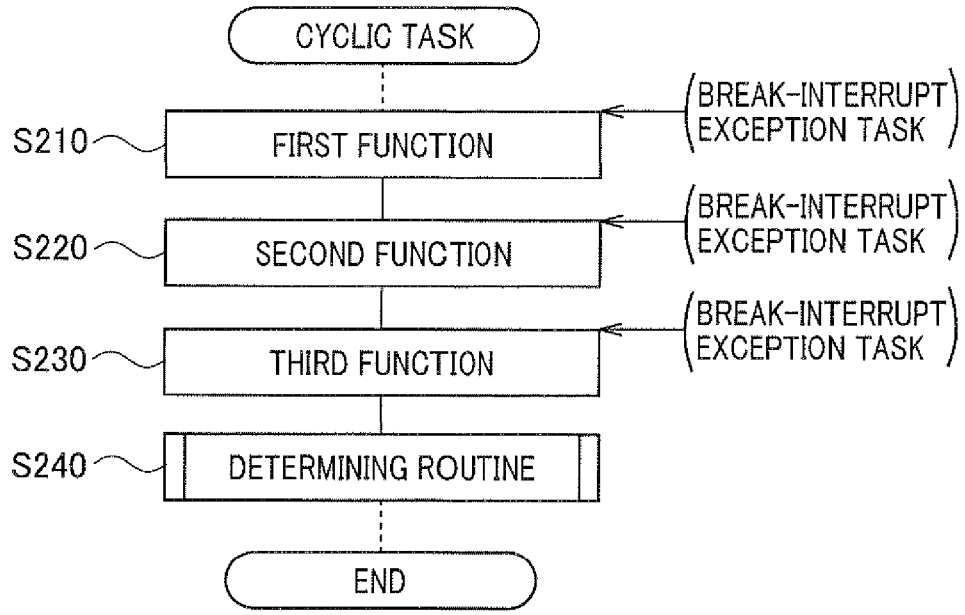
FIG. 4 is a flow chart schematically illustrating a cyclic task to be executed by the CPU according to the first embodiment.

Embodiments of the present invention will be described hereinafter with reference to the accompanying drawings.

First Embodiment

Referring to FIG. 1A, there is illustrated the overall structure of a microcomputer 10 according to a first embodiment of the present invention.

The microcomputer 10 includes a CPU 11 for performing various tasks, a flash memory (FLASH) 13, a RAM 15 serving as a working memory for the CPU 11, an interrupt controller 17, a user break controller (UBC) 18, and an interface (I/F) 19 for allowing the CPU 11 to communicate with external devices. The CPU 11, the flash memory 13, the RAM 15, the interrupt controller 17, the user break controller 18, and the interface 19 communicate with each other via buses 50 including data buses and address buses.

The flash memory 13 stores therein various programs P for the various tasks to be executed by the CPU 11 in accordance with an operating system loaded in the RAM 15; each of these programs consists of a set of sequenced programs and a set of pieces of data used therefor.

The CPU 11 includes a plurality of registers at least one of which serves as a program counter 11a. When launching any one program (target program) stored in the flash memory 13, the CPU 11 copies the target program to the RAM 15 such that the sequenced instructions of the target program are stored in predetermined memory locations of the RAM 15 to which predetermined addresses are assigned. Similarly, the pieces of data of the target program are stored in predetermined memory locations of the RAM 15 to which predetermined addresses are assigned.

The program counter 11a works to increment its count value in each instruction to indicate the address of the next instruction to thereby obtain the sequence of the instructions.

As the user break controller 18, one of well-known user break controllers is used.

Referring to FIG. 1B, the user break controller 18 is integrated with a break address register 18a and a break condition comparator 18b. For example, to the break address register 18a, at least one address is set. When a function (an instruction) whose address has been set to the break address register 18a is carried out by the CPU 11, the break condition controller 18b works to receive the address via the address buses 50, and determine that a predetermined break condition is met, thus inputting, to the CPU 11 via the interrupt controller 17, a break interrupt request.

More specifically, the break condition comparator 18b works to input, to the CPU 11, the break interrupt request immediately before the function whose address has been set to the break address register 18a is carried out by the CPU 11.

The interrupt controller 17 works to control interrupt requests including the break interrupt request to be passed to the CPU 11. Specifically, when the break interrupt request is input to the interrupt controller 17 from the user break controller 18, the interrupt controller 17 works to input the inputted break interrupt request to the CPU 11.

Figure 5:
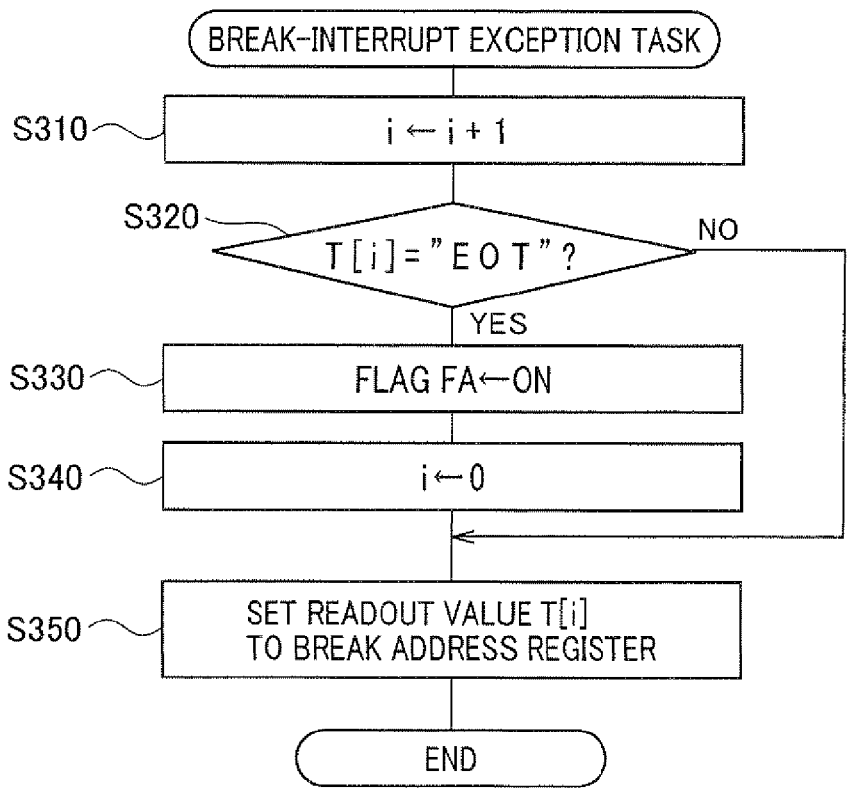
FIG. 5 is a flow chart schematically illustrating a break-interrupt exception task to be executed by the CPU according to the first embodiment.

Upon receiving the break interrupt request sent from the interrupt controller 17, the CPU 11 works to temporarily save, in, for example, the RAM 15, the address equivalent to the count value of the program counter 11a, and carry out a break-interrupt exception task (routine) corresponding to the break interrupt request (see FIG. 5). After completion of the break-interrupt exception task, the CPU 11 works to read the function (instruction) stored in the saved address of the RAM 15 and execute the readout function (instruction).

The flash memory 13 also stores therein an address setting table T. In the address setting table T, addresses of functions (routines, subroutines) included in each of the various programs P stored in the flash memory 13 are stored. In the first embodiment, in order to check the sequence of instructions in a target program to be tested in the flash memory 13, the address of the functions included in the target program have been written into the address setting table T by a designer and/or a program developer corresponding to the target program.

Specifically, in the first embodiment, the microcomputer 10 is designed to test whether a plurality of functions in a target program to be tested are executed in a designed order so as to test whether the sequence of instructions in the target program is normal. In order to allow the microcomputer 10 to execute the program test, a designer and/or a program developer produces, in, for example, file format, the address setting table T in which the addresses of the functions included in the target program to be tested are described in the execution sequence of the functions. Thereafter, the designer and/or developer writes, into the flash memory 13, the produced address setting table T with, for example, a memory writer.

A target program to be tested in the various programs P stored in the flash memory 13 is designed such that the first function, the second function, . . . , and the N-th function are executed in this order (N is an integer equal to or greater than 2). In the first embodiment, the N is set to "3".

In order to test whether the first to N-th (third) functions are sequentially executed in this order, the designer or the program developer of the target program writes an address of the first function into a record of a table at its i-th table address. The reference character "i" represents a pointer for indicating an address of a record of the table. Specifically, the address of the first instruction is written into the record of the table at its 0-th table address.

The designer or the program developer also writes an address of the second function into a record of the table at its first (1-th) table address (i="1"). Similarly, the designer or the program developer sequentially writes addresses of the k-th functions (k is 3, . . . , N−1) into respective records of the table at their (k−1)-th table addresses (i"k−1").

The designer or the program developer further writes the N-th function into a record of the table at its (N−1)-th table address (i="N−1"). Finally, the designer or the program developer writes a code indicative of EOT (End Of Table) into a record of the table at its N-th table address (i="N"). These writing operations provide the table as the address setting table T. Thereafter, the designer or the program developer writes, into the flash memory 13, the created address setting table T.

Note that a variable indicating a value stored in the record of the address setting table T with the i-th table address is referred to as "T[i]" (see FIG. 2). For example, the address of the first function stored in the record of the address setting table T with the 0-th table address can be referred to as "T[0]".

In addition, note that all functions in the target program are not required to be tested. Specifically, some of the functions in the target program can be extracted, and addresses of the extracted functions can be written into the address setting table T.

In the first embodiment, the CPU 11 is programmed to carry out an initializing task, a task based on the target program, and the break-interrupt exception task to thereby:

sequentially set the addresses of the first to third functions stored in the address setting table T to the break address register 18a; and check whether the sequence of instructions in the target program is normal based on a history of execution of the break-interrupt exception task by the CPU 11 in response to the break interrupt request.

Figure 7:
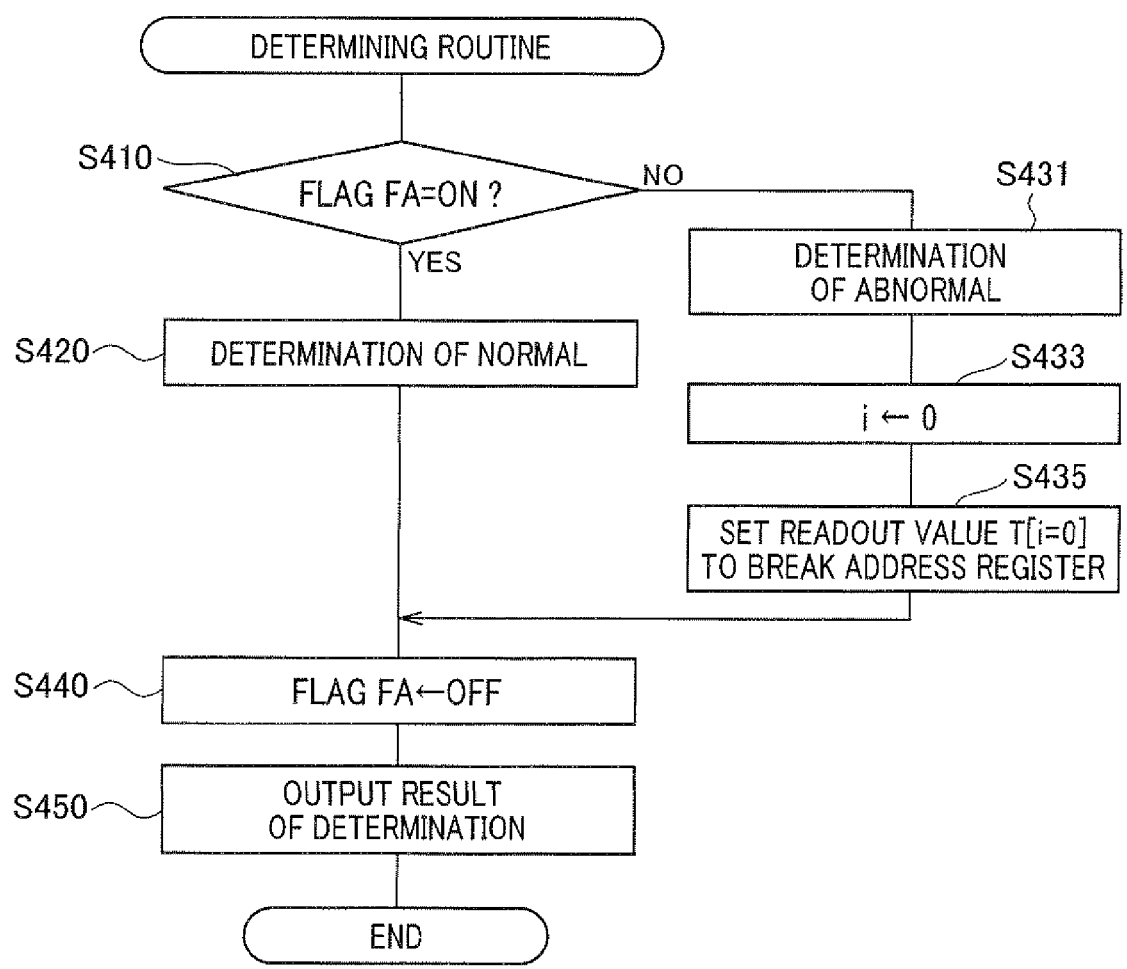
FIG. 7 is a flow chart schematically illustrating a determining routine to be executed by the CPU according to the first embodiment.

Specifically, the target program to be tested is designed to include a routine of determining whether the sequence of instructions therein is normal; this determining routine is located in the target program after the third (N-th) function (see FIGS. 4 and 7).

An initializing program is designed to be stored in, for example, the flash memory 13 as one of the various programs P. The initializing program causes the CPU 11 to execute the initializing task illustrated in FIG. 3 before the CPU 11 executes the task based on the target program. In addition, a break-interrupt exception handler (program) is designed to be stored in, for example, the flash memory 13 as one of the various programs P. The break-interrupt exception handler causes the CPU 11 to execute the break-interrupt exception task illustrated in FIG. 5.

Specifically, the microcomputer 10 with the flash memory 13 in which the address setting table T and the various programs P including the target program to be tested, the initializing program, and the break-interrupt exception handler are stored works to carry out the test of the target program as follows.

Before executing the target program, the CPU 11 runs the initializing program to thereby carry out the initial task.

Referring to FIG. 3, when launching the initializing program, the CPU 11 initializes the pointer "i" to zero (0); this pointer "i" indicates an address of a record of the address setting table T in step S110. In step S110, the CPU 11 set a parameter FA used as a flag to OFF (zero). The parameter FA will be referred to as "flag FA" hereinafter. Note that the flag FA is for example set by software in the CPU 11.

Next, the CPU 11 references the record of the address setting table T indicated by the pointer "i=0" to thereby read the address T[0] stored in the record of the table T at its i-th (0-th) table address in step S120. In step S120, the CPU 11 sets the readout address T[0] to the break address register 18*a*, exiting the initializing task as a preliminary task for the test of the target program.

After completion of the initializing task, the CPU 11 runs the target program to thereby carry out the task based on the target program.

In the first embodiment, the target program is designed to be cyclically executed by the CPU 11. Specifically, the task based on the target program illustrated in FIG. 4 is periodically carried out by the CPU 11. The task based on the target program and cyclically executed by the CPU 11 will be referred to as "cyclic task" hereinafter. As the target program, one of programs required to be cyclically executed, such as actuator control programs for motor vehicles, can be used.

Referring to FIG. 4, when launching the target program, the CPU 11 sequentially calls first, second, and third functions and carries out them in steps S210, S220, and S230. Thereafter, the CPU 11 carries out the determining routine in accordance with the determining program in step S240 (see FIG. 7), terminating the cyclic task for one cycle. After a predetermined cycle has elapsed since the start of the cyclic task, the CPU 11 launches the target program again to thereby carry out the cyclic task illustrated in FIG. 4. Specifically, the CPU 11 runs the target program to thereby execute the cyclic task each predetermined cycle.

However, the first, second, and third functions in the target program may not be carried out in this order illustrated in FIG. 4 due to a program design flaw or the like. For example, one of the first, second, and third functions may not be carried out by the CPU 11.

In the first embodiment, as described above, when the first function is carried out by the CPU 11, because the address T[0] of the first function is set to the break address register 18*a*, the break condition controller 18*b* inputs, to the CPU 11 via the interrupt controller 17, the break interrupt request.

Every time of receipt of the break interrupt request inputted from the interrupt controller 17, the CPU 11 runs the break-interrupt exception handler to thereby carry out the break-interrupt exception task illustrated in FIG. 5. This allows detection of such an error.

Referring to FIG. 5, when the break-interrupt exception task is activated, the CPU 11 increments the pointer "i" by 1, in other words, sets "i+1" as the pointer "i" in step S310.

Next, in step S320, the CPU 11 reads the value T[i] stored in the record of the address setting table T at its i-th table address. Then, the CPU 11 determines whether the readout value T[i] is equal to the code "EOT" in step S320.

Upon determining that the readout value T[i] is not equal to the code "EOT" (NO in step S320), the CPU 11 proceeds to step S350. In step S350, the CPU 11 sets the readout value T[i] to the break address register 18*a*, exiting the break-interrupt exception task.

Otherwise, upon determining that the readout value T[i] is equal to the code "EOT" (YES in step S320), the CPU 11 sets the flag FA to ON (1) in step S330, and initializes the pointer "i" to zero (0) in step S340. Thereafter, the CPU 11 reads the value T[i=0] stored in the record of the address setting table T at its i-th table address, and sets the readout value T[i=0] to the break address register 18*a* in step S350, exiting the break-interrupt exception task.

Specifically, in the break-interrupt exception task, it is determined whether the break interrupt request that causes execution of the break-interrupt exception task is generated by execution of the last ordered function by the CPU 11 (see step S320).

More specifically, the pointer "i" is incremented by 1 in step S310 of the break-interrupt exception task after the break interrupt request has been generated by a function to be executed by the CPU 11. For this reason, when the value T[i] whose pointer "i" is incremented by 1 in step S310 corresponds to the code "EOT" (YES in step S320), the break interrupt request has been generated by the last ordered function to be executed by the CPU 11.

When it is determined that the break interrupt request is not generated by execution of the last ordered function by the CPU 11 (NO in step S320), the address of the next ordered function in the address setting table T following the function whose address set to the break address register 18*a* is set to the break address register 18*a* (see step S350).

Otherwise, when it is determined that the break interrupt request is generated by execution of the last ordered function by the CPU 11 YES in step S320), the flag FA is set to ON (see step S350). In addition, the address T[0] of the first function (first ordered function) in the address setting table T is set to the break address register 18*a* (see step S350).

Note that the break-interrupt exception task is, for example, carried out immediately before each of the first to third functions is executed so long as the first, second, and third functions are normally executed in this order during one cycle C1 of the cyclic task (see FIG. 4). When the first, second, and third functions are normally executed in this order, the break interrupt request is generated by the last ordered (third) function to be executed. In the break-interrupt exception task caused by the generated break interrupt request, the flag FA is set to ON (see the left side of FIG. 6A).

In contrast, when one of the first, second, and third functions is not executed (skipped or passed out) by the CPU 11 due to, for example, a program design flaw, change in variables in at least one function, and/or the load on the CPU 11, the break interrupt request that should be generated when the skipped function is executed is not generated. For this reason, the value set to the break address register cannot be updated so that, even if at least one ordered function following the skipped function is executed, no break interrupt requests are generated.

For example, the execution timing of the break-interrupt exception task and the change in the flag FA when the second and third functions are skipped during one cycle C2 of the cyclic task are illustrated in the right side of FIG. 6A.

The right side of FIG. 6A clearly demonstrates that the flag FA that should be updated to ON when the last ordered function (third function) is executed is kept OFF.

Specifically, in the first embodiment, when the flag FA is set to ON at the time of completion of the last ordered function (N-th function), the first to N-th functions are executed in this order designed in the address setting table T.

In contrast, when the flag FA is set to OFF at the time of completion of the last ordered function (N-th function), at least one of the functions is skipped so that the sequence of instructions including the first to N-th functions in the target program is abnormal.

That is, in the first embodiment, the value assigned to the flag FA represents historical information indicative of whether the interrupt request corresponding to at least one of the first to N-th functions is generated. In other words, the value assigned to the flag FA represents historical information indicative of activation or inactivation of the break-interrupt exception task corresponding at least one of the first to N-th functions.

Thus, the microcomputer 10 according to the first embodiment runs the determining routine after the N-th function in the target program based on the flag FA to thereby determine whether the sequence of instructions in the target program is normal.

Referring to FIG. 7, when launching the determining routine, the CPU 11 determines whether the flag FA is set to ON in step S410.

Upon determining that the flag FA is set to ON (YES in step S410), the CPU 11 determines that the sequence of instructions in the target program is normal in step S420. Then, the CPU 11 sets the flag FA to OFF in step S440. Thereafter, in step S450, the CPU 11 outputs, to the flash memory 13, the interface 19, or the like, information indicative of the result of determination in step S420. Specifically, the CPU 11 outputs, as the information indicative of the result of determination in step 420, the sequence of instructions in the target program being normal.

For example, in step S450, the CPU 11 saves the information in the flash memory 13 as a logfile, or outputs the information to an external device, such as a sub microcomputer when it is communicably connected to the interface 19 of the microcomputer 10.

Otherwise, upon determining that the flag FA is set to OFF (NO in step S410), the CPU 11 determines that the sequence of instructions in the target program is abnormal in step S431. Then, the CPU 11 sets the pointer "i" to zero (0) in step S433. Thereafter, the CPU 11 reads the value T[i=0] stored in the record of the address setting table T at its i-th table address, and sets the readout value T[i=0] to the break address register 18a in step S435, going to step S440.

In step S440, the CPU 11 sets the flag FA to OFF. Thereafter, in step S450, the CPU 11 outputs, to the flash memory 13, the interface 19, or the like, information indicative of the result of determination in step S431. Specifically, the CPU 11 outputs, as the information indicative of the result of determination in step S431, the sequence of instructions in the target program being abnormal.

In step S440, setting of the flag FA to OFF allows the CPU 11 to determine, based on the flag FA, whether the sequence of instructions in the target program during the next cycle of the cyclic task.

As described above, the microcomputer 10 is configured to store therein the address setting table T in which the addresses of the first to N-th functions (first to third functions) included in the target program to be tested are stored in the execution sequence of the functions. The microcomputer 10 is also configured to determine whether the sequence of instructions in the target program is normal based on the address setting table T to thereby easily carry out the test of the target program.

Figure 24A:
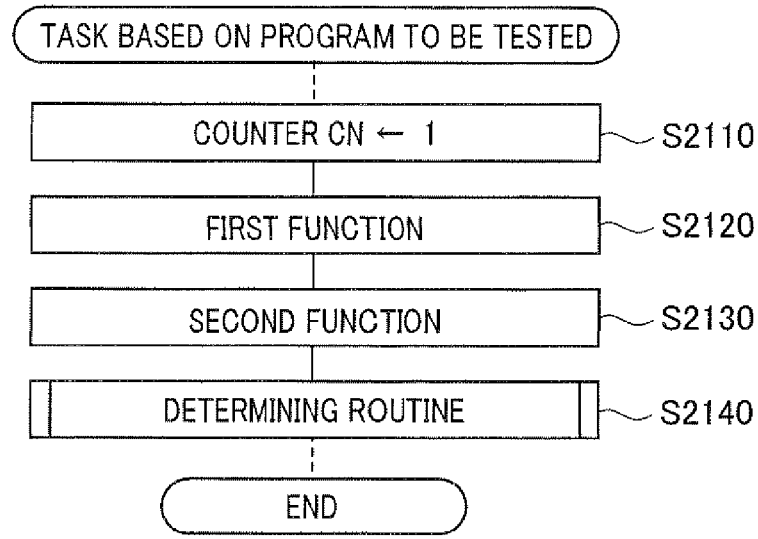
FIG. 24A is a flow chart schematically illustrating a task to be executed by a CPU based on a program to be tested.
Figure 24B:
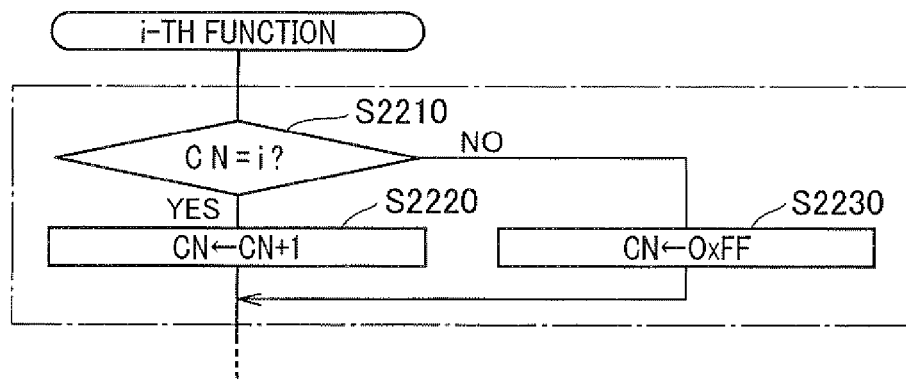
FIG. 24B is a flow chart schematically illustrating an i-th function included in the program illustrated in FIG. 24A.
Figure 24C:
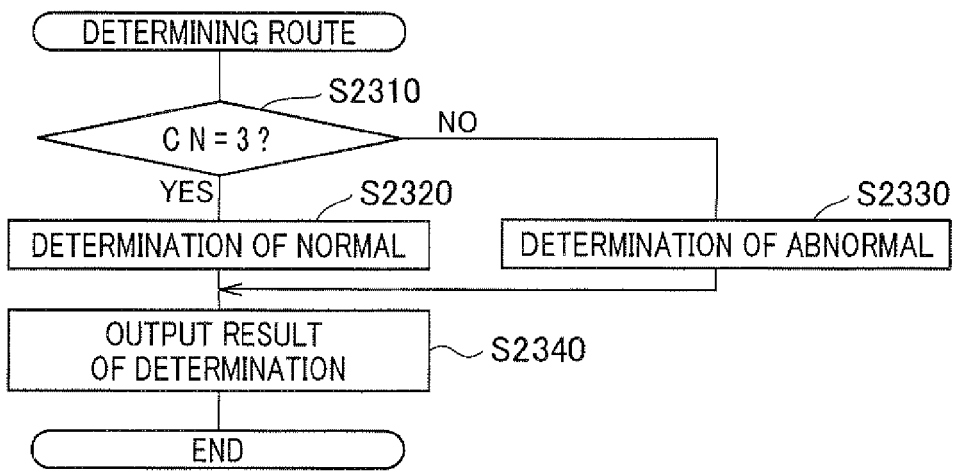
FIG. 24C is a flow chart schematically illustrating a determining routine included in the program illustrated in FIG. 24A and located after a last-ordered function included in the program.

Specifically, the microcomputer 10 carries out the determination of whether the sequence of instructions in the target program is normal without adding, like the check method described in the "SUMMARY OF THE INVENTION" of this specification, the instructions in steps S2210, S2220, and S2230 required to increment the count value CN illustrated in FIG. 24B. This makes it possible to more simply check whether the sequence of instructions in the target program is normal as compared with the check method.

In particular, even if a new function is added to the target program to be tested so that the designed execution sequence of the functions in the target program is changed, it is possible to accurately check the target program by merely changing the address setting table T without fixing each of the functions. Thus, the microcomputer 10 achieves an effect of reducing the time and effort required to check whether the sequence of the instructions in the target program is normal.

In the first embodiment, the microcomputer 10 cannot detect which function is skipped, but the present invention is not limited to the structure. Specifically, in a modification of the first embodiment, the microcomputer 10 can be configured to detect which function is skipped in each cycle of the cyclic task.

Figure 6C:
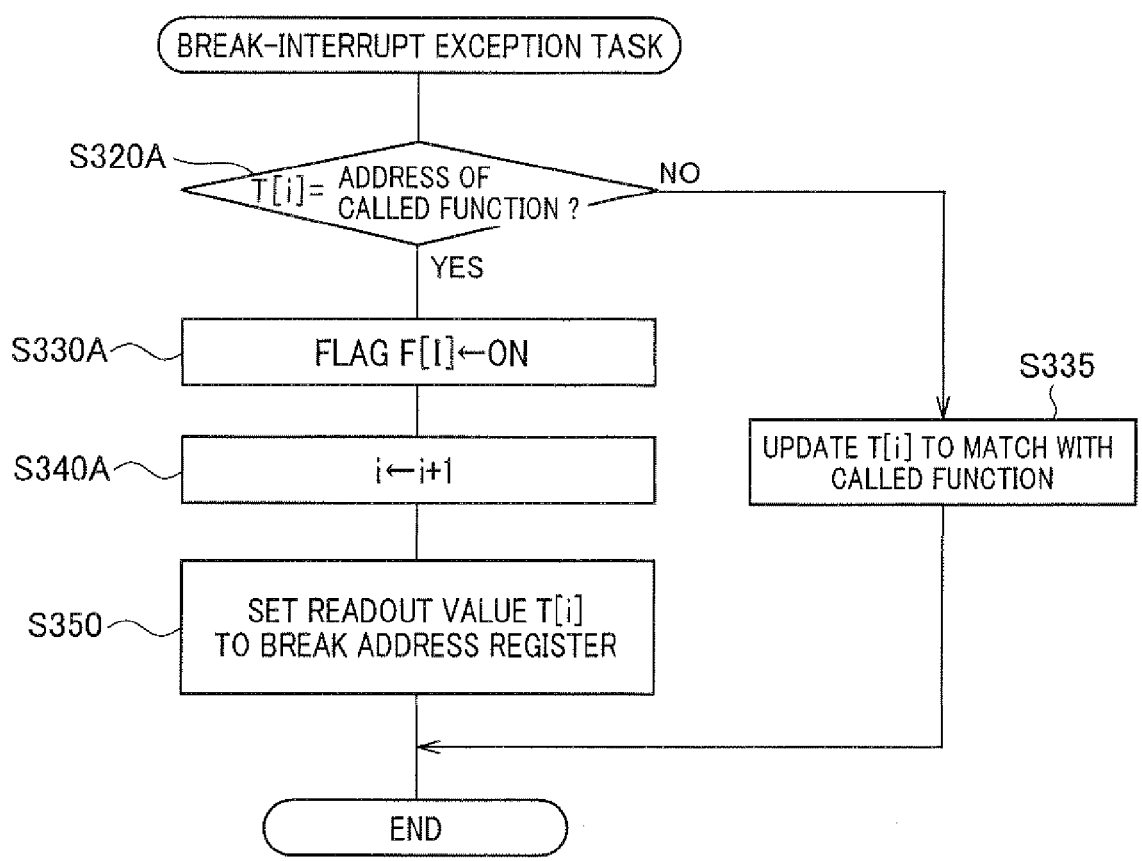
FIG. 6C is a flow chart schematically illustrating a break-interrupt exception task to be executed by the CPU according to the modification of the first embodiment.

Referring to FIGS. 6B and 6C, in the microcomputer 10 according to the modification of the first embodiment, a flag F[i] for the i-th function is used as an example of the historical information indicative of whether the interrupt request corresponding to each of the first to N-th functions.

Specifically, in place of the break-interrupt exception task illustrated in FIG. 5, the microcomputer 10 is configured to carry out a break-interrupt exception task (see FIG. 6C) every time of receipt of the break interrupt request inputted from the interrupt controller 17.

When the break-interrupt exception task is activated, the CPU 11 reads the value T[i] stored in the record of the address setting table T at its i-th table address. Then, the CPU 11 determines whether the readout value T[i] is equal to the address of a called function in step S320A of FIG. 6C.

Upon determining that the readout value T[i] is not equal to the address of the called function (NO in step S320A), the CPU 11 proceeds to step S335. In step S335, the CPU 11 updates the value T[i] stored in the record of the address setting table T at its i-th table address to match with the address of the called function, exiting the break-interrupt exception task.

Otherwise, upon determining that the readout value T[i] is equal to the address of called function (YES in step S320A), the CPU 11 sets the flag FA to ON (1) in step S330.

Thereafter, the CPU 11 increments the pointer "i" by 1, in other words, sets "i+1" as the pointer "i" in step S340A.

Next, the CPU 11 reads the value T[i] stored in the record of the address setting table T at its i-th table address, and sets the readout value T[i] to the break address register 18a in step S350, exiting the break-interrupt exception task.

In this modification, in step S410, the CPU 11 determines whether each of the flags F[0] to F[2] is set to ON. Upon determining that each of the flags F[0] to F[2] is set to ON YES in step S410), the CPU 11 determines that the sequence of instructions in the target program is normal in step S420. Then, the CPU 11 sets each of the flags F[0] to F[2] to OFF in step S440.

Otherwise, upon determining that at least one of the flags F[0] to F[2] is set to OFF (NO in step S410), the CPU 11 determines that the sequence of instructions in the target program is abnormal in step S431. Then, the CPU 11 sets the pointer "i" to zero (0) in step S433. Thereafter, the CPU 11 reads the value T[i=0] stored in the record of the address setting table T at its i-th table address, and sets the readout value T[i=0] to the break address register 18a in step S435, going to step S440.

In step S440, the CPU 11 sets each of the flags F[0] to F[2] to OFF.

Specifically, during the first to last-ordered functions being normally executed, in the break-interrupt exception task, the value T[i] set to the break address register 18a corresponds to the address of a called function that causes execution of the break-interrupt exception task (see step S320A).

More specifically, when the first (i=0) function is called to be executed after the initializing task is carried out, because the value T[i=0] corresponds to the address of the called first function, the determination in step S320A is YES. Thus, the flag F[i=0] is set to ON, and the pointer "i" is incremented by 1 (see steps S 330A and 340A). Thereafter, as similar to the first embodiment, the address T[i=1] of the second function (next ordered function) in the address setting table T is set to the break address register 18a (see step S350).

As described above, when the first, second, and third functions are normally executed in this order, the flags F[0], F[1], and F[2] are set to ON in this order (see the left side of FIG. 6B).

In contrast, it is assumed that the third (i=2) function is called to be executed after the first function is carried out, in other words, that the second function is skipped.

In this assumption, because the value T[i=1] set by the break-interrupt exception task corresponding to execution of the first function does not correspond to the address of the called third function, the determination in step S320A is NO. Thus, in step S335, the value T[i] is updated so that the updated value T[i] is matched with the called function.

Specifically, in this assumption, the value T[i=1] is updated to a value T[i=2] so that the updated value T[i=2] is matched with the called third function.

At that time, because no break interrupt request for the second function is generated so that the break-interrupt exception task corresponding to execution of the second function is skipped, the flag F[1] corresponding to the second function is kept OFF.

Thus, as illustrated in the right side of FIG. 6B, the flag F[1] corresponding to the second function is kept OFF except for the other flags F[0] and F[2]. This makes it possible for the microcomputer 10 to identify that the second function is skipped (see the right side of FIG. 6B).

Specifically, in the modification of the first embodiment, determination of which flag is set to OFF can identify which function is skipped.

In the first embodiment and the modification thereof the operation in step S340 in the break-interrupt exception task in response to the last-ordered function during one cycle C1 of the cyclic task initializes the pointer "i" to zero (0). In addition, the operation in step S350 in the break-interrupt exception task in response to the last-ordered function during the one cycle C1 of the cyclic task sets the readout value T[i=0] to the break address register 18a.

Specifically, the start address T[i=0] in the address setting table T is set to the break address register 18a.

Thus, when the next one cycle C2 of the cyclic task is carried out (see FIGS. 6A and 6C), the break-interrupt exception task executed in response to execution of each of the first to last-ordered functions allows the flag FA to be set ON when the first to third functions are executed in this order.

Accordingly, in the first embodiment and the modification thereof, even if the target program is cyclically executed so that the cyclic task is cyclically executed, the microcomputer 10 can test whether the sequence of the instructions included in each cycle of the target program is normally carried out.

Note that the configuration of the microcomputer 10 illustrated in FIG. 1 can be introduced upon designing each of the various programs P to be tested, and the information indicative of the result of determination in step S410 can be used to debug a corresponding one of the various programs P. The configuration of the microcomputer 10 illustrated in FIG. 1 can be introduced into products for controlling motor vehicles based on the various programs P, and the information indicative of the result of determination in step S410 can be used for a failsafe task. The failsafe task means an operation which, in the event of failure, fails in a way that will cause no harm or at least a minimum of harm to other devices.

For example, a vehicle control system integrated with the microcomputer 10 can be installed in a controlled motor vehicle. In this structure, vehicle control programs are stored in the flash memory 13 as the various programs P.

In parallel with the vehicle control tasks, the microcomputer 10 is programmed to carry out the initializing task, the cyclic task, the break-interrupt exception task, and the determining routine set forth above. A sub microcomputer is communicably coupled to the interface 19 of the microcomputer 10 and programmed to carry out the failsafe task.

Specifically, the microcomputer 10 is programmed to output, to the sub microcomputer, the information indicative of the result of determination in step S410. The sub microcomputer carries out the failsafe task when the information indicative of the result of determination in step S410 represents that the sequence of instructions in one target program included in the vehicle control programs is abnormal.

Thus, the configuration of the vehicle control system can appropriately address bugs in a target program included in the vehicle control programs; these bugs cause the sequence of instructions in the target program to become abnormal. This makes it possible to provide, to consumers, the vehicle control system with high reliability.

Second Embodiment

A microcomputer according to a second embodiment of the present invention will be described hereinafter.

In the second embodiment, an example of the hardware structure of a microcomputer according to the second embodiment is identical to the hardware structure of the microcomputer 10 according to the first embodiment. For this reason, the illustration of the hardware structure of the microcomputer according to the second embodiment is omitted.

Like reference characters are therefore assigned to like parts in the microcomputers according to the first and second embodiments, and different functions of the microcomputer according to the second embodiment from those of the microcomputer 10 according to the first embodiment will be described hereinafter.

Figure 8:
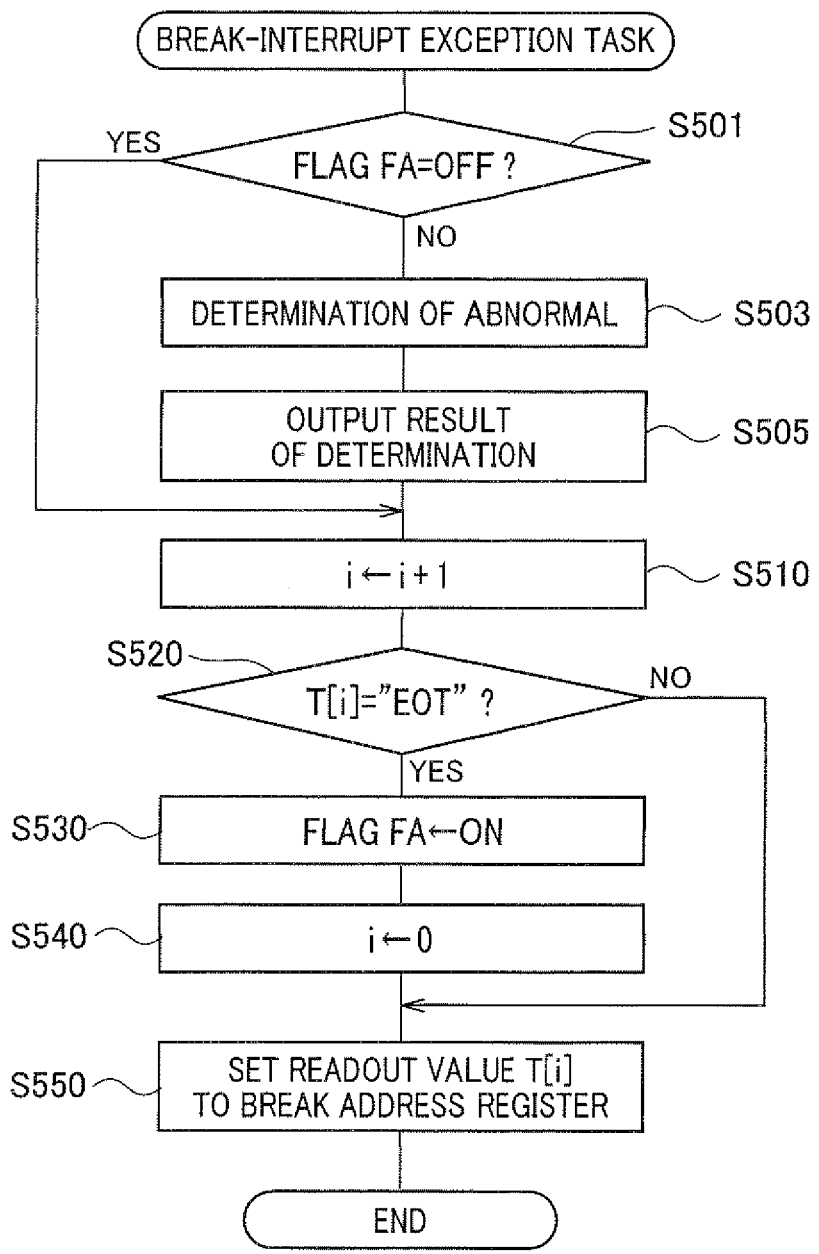
FIG. 8 is a flow chart schematically illustrating a break-interrupt exception task to be executed by a CPU according to a second embodiment of the present invention.

FIG. 8 schematically illustrates a break-interrupt exception task to be executed by a CPU 11 of the microcomputer according to the second embodiment of the present invention. Other tasks to be executed by the CPU 11 according to the second embodiment are substantially identical to those of the CPU 11 according to the first embodiment, and therefore, descriptions of the other tasks will be omitted.

Referring to FIG. 8, every time of receipt of the break interrupt request inputted from the interrupt controller 17, the CPU 11 activates the break-interrupt exception task.

Specifically, the CPU 11 determines whether the flag FA is set to OFF in step S501.

Upon determining that the flag FA is set to OFF (YES in step S501), the CPU 11 proceeds to step S510 without executing operations in steps S503 and S505.

Otherwise, upon determining that the flag FA is set to ON (NO in step S501), the CPU 11 determines that the determining routine is abnormal in step S503. In other words, the CPU 11 determines that the determining routine has been skipped or passed out in step S503.

Then, the CPU 11 outputs, to the flash memory 13, the interface 19, or the like, information indicative of the result of determination in step S503. Specifically, the CPU 11 outputs, as the information indicative of the result of determination in step 503, the determining routine in the target program being abnormal, and thereafter, proceeds to step S510.

In step S510, the CPU 11 reads the value T[i] stored in the record of the address setting table T at its i-th table address. Then, the CPU 11 determines whether the readout value T[i] is equal to the code "EOT" in step S520 as in the operation of step S320.

Thereafter, the CPU 11 executes the operations in steps S520 to S550 equivalent to the operations in steps S320 to S350 illustrated in FIG. 5, and thereafter, the CPU 11 terminates the break-interrupt exception task.

Figure 9:
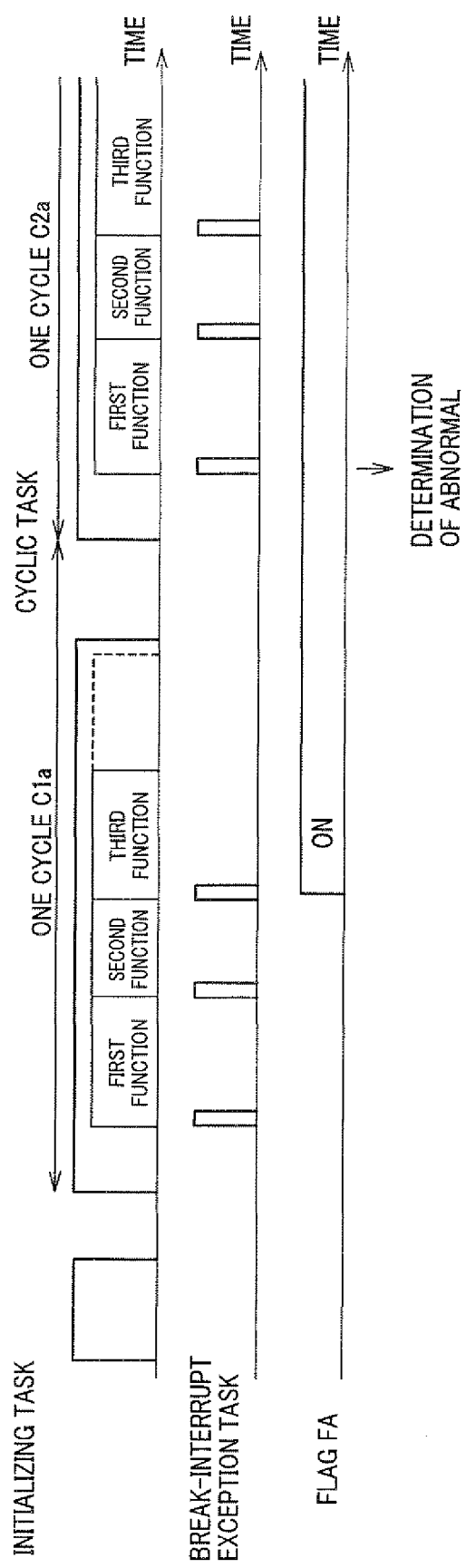
FIG. 9 is a timing chart schematically illustrating a relationship between an execution timing of each function in the target program to be tested, an execution timing of each break-interrupt exception task, and a value of the flag set in the CPU according to the second embodiment.

Specifically, after the flag FA is set to ON by the execution of the last ordered function (N-th function), it is assumed that no determining routine is performed during one cycle C1a of the cyclic task (see FIG. 9).

In this assumption, because the determining routine includes the operation of initializing the flag FA to OFF in step S440 (see FIG. 7), the next one cycle C2a of the cyclic task is performed while the flag FA is kept ON.

At that time, in order to detect skipping the determining routine, the break-interrupt exception task according to the second embodiment includes the determining operation in step S501. Specifically, in step S501 of the break-interrupt exception task of the one cycle C2a of the cyclic task, the CPU 11 carries out the determining operation in step S501 to thereby determine whether the flag FA is set to OFF.

When it is determined that the flag FA is kept ON, the CPU 11 can detect skipping the determining routine during the previous one cycle C1a of the cyclic task, thus outputting the abnormality due to skipping the determining routine (see FIG. 9).

Thus, in addition to the effects achieved by the microcomputer 10 according to the first embodiment, the microcomputer according to the second embodiment achieves an effect of more reliably carrying out the test of the target program.

Third Embodiment

A microcomputer according to a third embodiment of the present invention will be described hereinafter. The microcomputer according to the third embodiment has substantially the same structure as that of the microcomputer according to the first embodiment except for some components. For this reason, like reference characters are assigned to like parts in the microcomputers according to the first and third embodiments so that descriptions of the parts of the microcomputer according to the third embodiment will be omitted or simplified.

In the structure of the microcomputer according to the second embodiment, if the first to N-th functions are abnormally carried out by the CPU 11, because the flag FA is not set to be ON, the CPU 11 cannot detect skipping the determining routine.

In order to address such a problem, the microcomputer 10A according to the third embodiment is configured to detect skipping the determining routine even if at least one of the first to N-th functions is abnormally performed.

Figure 10A:
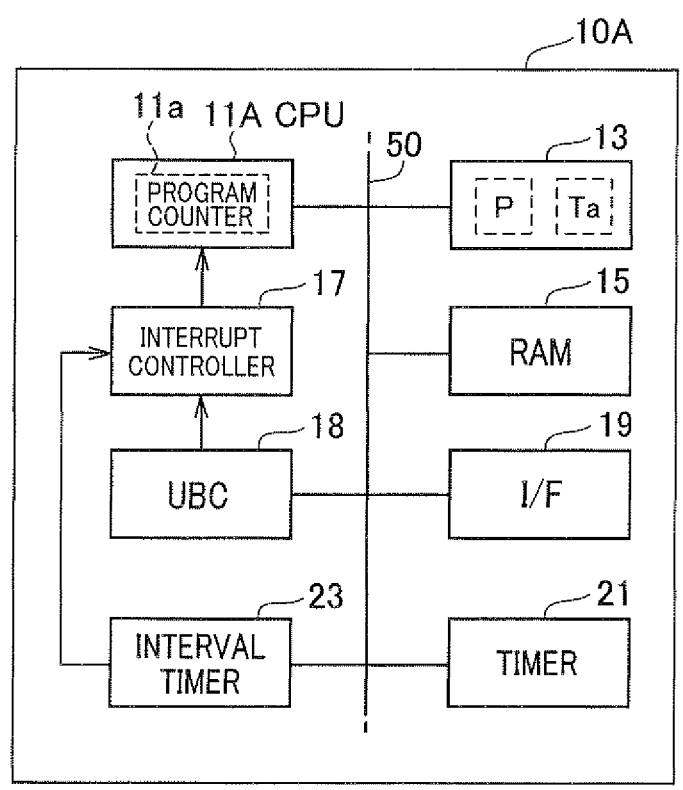
FIG. 10A is a block diagram schematically illustrating an example of the overall structure of a microcomputer according to a third embodiment of the present invention.

Referring to FIG. 10A, the microcomputer 10A includes a timer 21 and an interval timer 23 in addition to the structure of the microcomputer 10 according to the first embodiment. The timer 21 and the interval timer 23 are configured to communicate with a CPU 11A, the flash memory 13, the RAM 15, the interrupt controller 17, the user break controller 18, and the interface 19. The timer 21 and the interval timer 23 can be designed by hardware devices or software modules installed in the microcomputer 10A.

The interval timer 23 works to generate a cyclic interrupt request each predetermined cycle. The generated cyclic interrupt request is cyclically inputted to the CPU 11A via the interrupt controller 17. The predetermined cycle for generating the cyclic interrupt request is set to be sufficiently shorter than the execution period of the cyclic task to be executed by the CPU 11A in accordance with the target program.

The flash memory 13 of the microcomputer 10A according to the third embodiment stores therein an address setting table Ta. In the address setting table Ta, in addition to the addresses of the functions included in the target program, a start address of a parent function for calling the functions, that is, a start address of the target program has been written into the address setting table Ta by the programmer or the program developer of the target program.

Specifically, the designer or the program developer of the target program writes the start address of the target program into a record of the table Ta at its 0-th address.

In addition, the designer or the program developer of the target program writes an address of the first function into a record of the table Ta at its i-th table address. The reference character "i" represents a pointer for indicating an address of a record of the table. Specifically, the address of the first instruction is written into the record of the table at its first (1-th) table address (i="1").

The designer or the program developer also writes an address of the second function into a record of the table Ta at its second (2-th) table address (i="2"). Similarly, the designer or the program developer sequentially writes addresses of the k-th functions (k is 3, . . . , N) into respective records of the table Ta at their k-th table addresses (i="k").

Finally, the designer or the program developer writes a code indicative of EOT (End Of Table) into a record of the table at its (N+1)-th table address (i="N+1"). These writing operations provide the address setting table Ta. Thereafter, the designer or the program developer writes, into the flash memory 13, the created address setting table Ta.

Figure 10B:
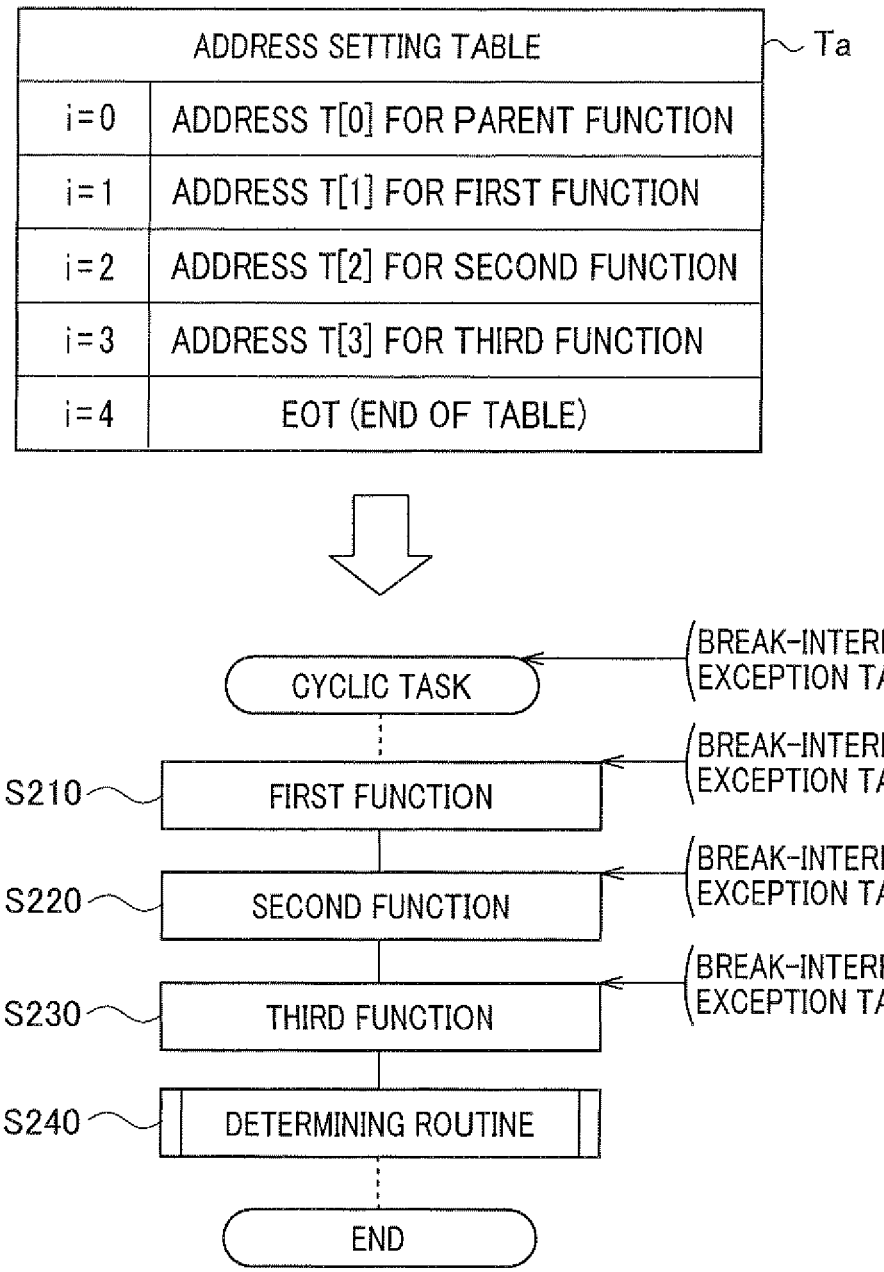
FIG. 10B is a view schematically illustrating an address setting table stored in the flash memory illustrated in FIG. 10A and a flow chart schematically illustrating a cyclic task to be executed by the CPU according to the third embodiment.

Note that a variable indicating a value stored in the record of the address setting table Ta with the i-th table address is referred to as "T[i]" (see FIG. 10B). For example, the address of the first function stored in the record of the address setting table Ta with the 1-th table address can be referred to as "T[1]".

Specifically, in the third embodiment, the break interrupt request is configured to be generated every time:

one of the first to N-th functions is executed in the order from the first function to N-th function; and the cyclic task is executed.

Every time of receipt of the break interrupt request inputted from the interrupt controller 17, a CPU 11A of the microcomputer 10A runs a break-interrupt exception handler stored in the flash memory 13 to thereby carry out a break-interrupt exception task according to the third embodiment illustrated in FIG. 11.

Referring to FIG. 11, when launching the break-interrupt exception handler, the CPU 11A determines whether zero (0) is set to the pointer "i" in step S601.

Upon determining that zero is set to the pointer "i" (YES in step S601), the CPU 11A resets a timer value TM of the timer 21 in step S603, and activates the timer 21 to measure an elapsed time since the activation of the timer 21 in step S605.

Specifically, when activated, the timer 21 works to measure an elapsed time since the activation thereof, and to update the measured elapsed time as the timer value TM.

Otherwise, upon determining that zero is not set to the pointer "i" (NO in step S601), the CPU 11A goes to step S610 without executing the operations in steps S603 and S605, and increments the pointer "i" by 1 in step S610. Then, the CPU 11A executes the operations in steps S620 to S650 equivalent to the operations in steps S320 to S350 illustrated in FIG. 5 when the address setting table T should be read as the address setting table Ta, and thereafter, the CPU 11A terminates the break-interrupt exception task.

Specifically, in the break-interrupt exception task, it is checked whether the break interrupt request that causes execution of the break-interrupt exception task is generated by execution of the first ordered parent function (target program) by the CPU 11A (see step S601).

Only when it is determined that the break interrupt request is generated by execution of the first ordered parent function by the CPU 11A, the timer 21 is reset and activated to measure an elapsed time since its activation (see steps S603 and S605). Specifically, the microcomputer 10A is programmed to activate the timer 21 to measure an elapsed time since the activation of the timer 21.

Figure 12:
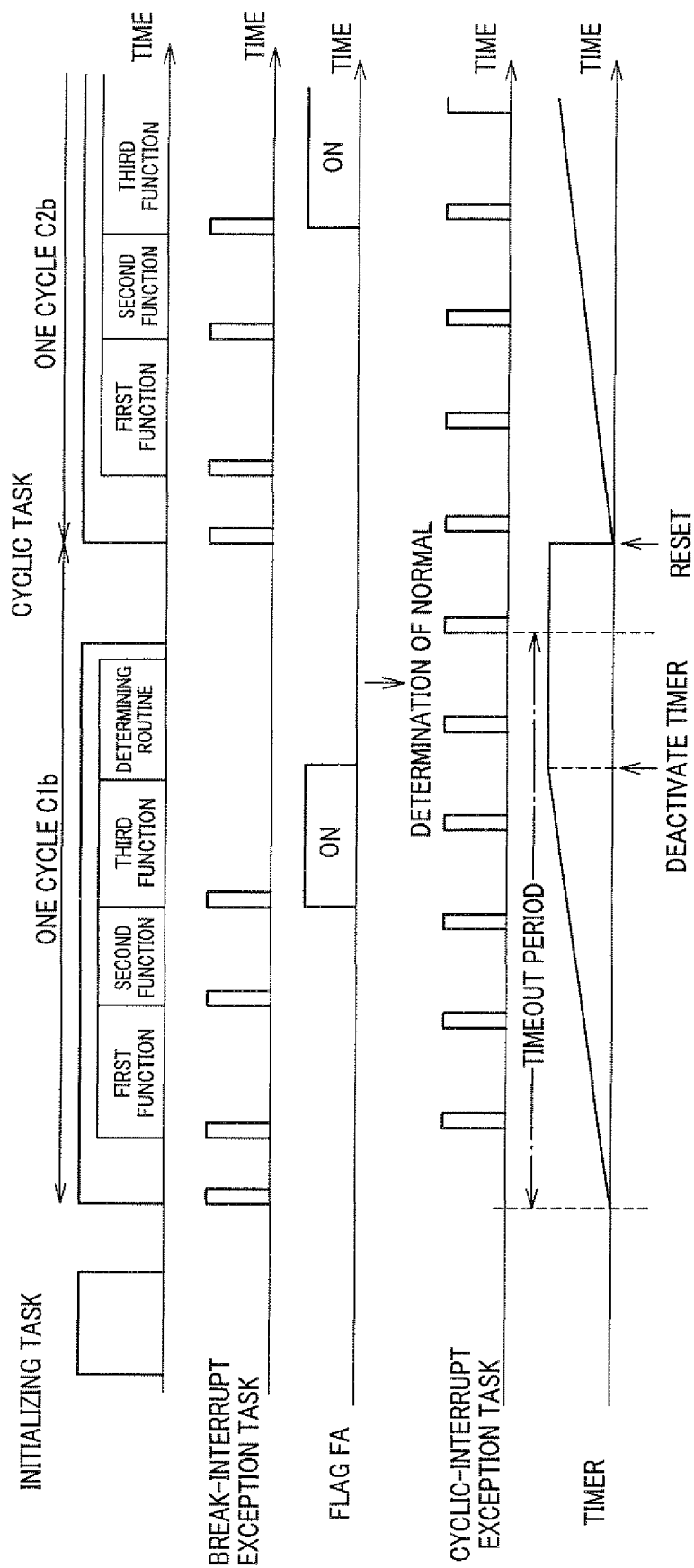
FIG. 12 is a timing chart schematically illustrates, when the cyclic task based on the target program is normally carried out, a relationship between an execution timing of each function in the target program, an execution timing of each break-interrupt exception task, a value of the flag set in the CPU, a timer value, and an execution timing of each cyclic-interrupt exception task according to the third embodiment.

FIG. 12 schematically illustrates, when the cyclic task based on the target program is normally carried out, a relationship between an execution timing of each function in the target program, an execution timing of each break-interrupt exception task, a value of the flag FA set in the CPU 11A, the timer value TM, and an execution timing of each cyclic-interrupt exception task described hereinafter.

In addition, the microcomputer 10A according to the third embodiment runs a determining routine (see step S240 in FIG. 10B) after the N-th function in the target program based on the flag FA to thereby determine whether the sequence of instructions in the target program is normal.

Figure 13:
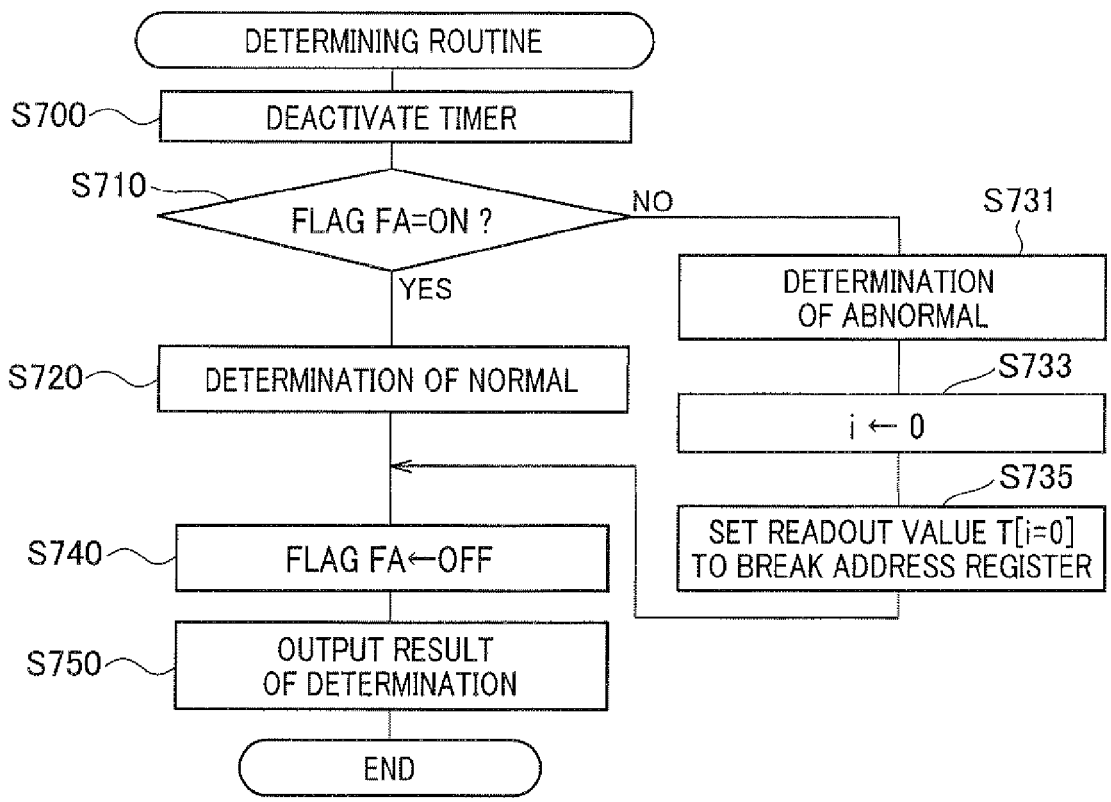
FIG. 13 is a flow chart schematically illustrating a determining routine to be executed by the CPU according to the third embodiment.

Referring to FIG. 13, when launching the determining routine, the CPU 11A deactivates the timer 21 to thereby stop update of the timer value TM in step S700. Thereafter, the CPU 11A executes the operations in steps S710 to S750 equivalent to the operations in steps S410 to S450 illustrated in FIG. 7, and thereafter, the CPU 11A terminates the determining routine.

As described above, the microcomputer 10A according to the third embodiment is configured to carry out the operations in the determining routine similar to those in the determining routine according to the first embodiment while preventing update of the timer value TM.

Figure 14:
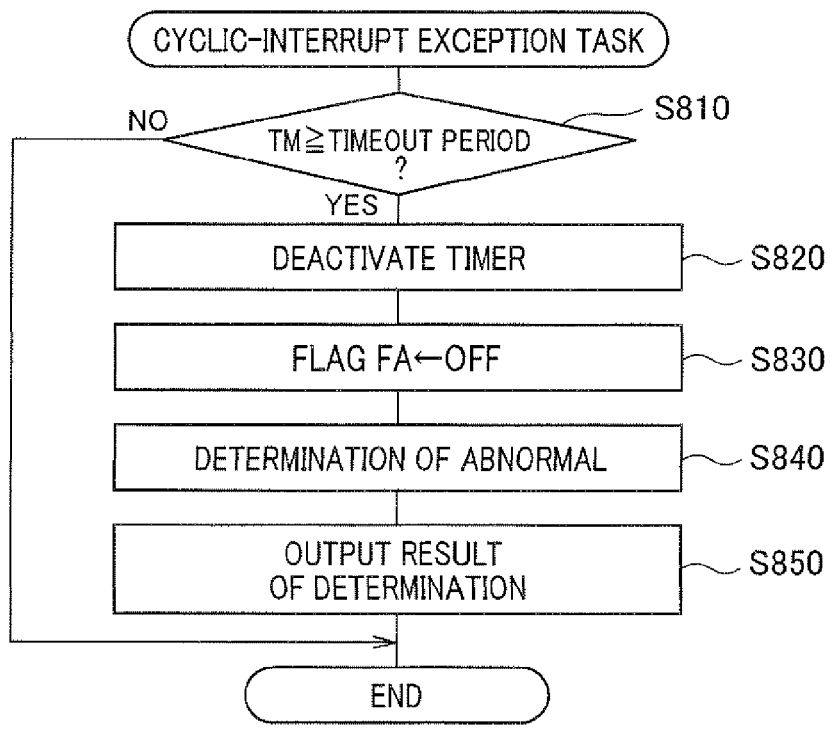
FIG. 14 is a flow chart schematically illustrating the cyclic-interrupt exception task to be executed by the CPU according to the third embodiment.

Every time of receipt of the cyclic interrupt request, the CPU 11A runs the cyclic-interrupt exception handler to thereby carry out the cyclic-interrupt exception task illustrated in FIG. 14.

When launching the cyclic-interrupt exception handler, the CPU 11A determines whether the elapsed time since activation of the timer 21 is equal to or greater than a preset timeout period in step S810.

The timeout period is preset to be:

longer than a time interval between the start timing of one cycle of the cyclic task and the start timing of the determining routine in the corresponding one cycle of the cyclic task; and shorter than the execution period of the cyclic task.

Upon determining that the elapsed time since activation of the timer 21 is lower than the preset timeout period (NO in step S810), the CPU 11A terminates the cyclic-interruption exception task without executing the operations in steps S820 to S850 described hereinafter.

Otherwise, upon determining that the elapsed time since activation of the timer 21 is equal to or greater than the preset timeout period (YES in step S810), the CPU 11A deactivates the timer 21 in step S820, and sets the flag FA to OFF in step S830. Thereafter, the CPU 11A determines that the determining routine is abnormal in step S840. In other words, the CPU 11A determines that the determining routine has been skipped or passed out in step S840.

Then, the CPU 11A outputs, to the flash memory 13, the interface 19, or the like, information indicative of the determining routine in the target program being abnormal in step S850, exiting the cyclic-interrupt exception task.

As described above, the microcomputer 10A according to the third embodiment is configured to determine whether a timeout occurs, and when a timeout occurs, to determine that skipping the determining routine occurs.

For example, in the third embodiment, the predetermined cycle for generating the cyclic interrupt request is set to be sufficiently shorter than the execution period of the cyclic task to be executed by the CPU 11A in accordance with the target program. More specifically, the generation period of the cyclic interrupt request is set such that at least one cyclic interrupt request is generated after execution of the determining routine in the normally executed cyclic task and before the next cycle of the cyclic task.

Specifically, if the determining routine in one cycle of the cyclic task is abnormally carried out, the cyclic-interrupt exception task by the CPU 11A determines such an abnormality of the determining routine, thus outputting the information indicative of the abnormality of the determining routine.

Figure 15:
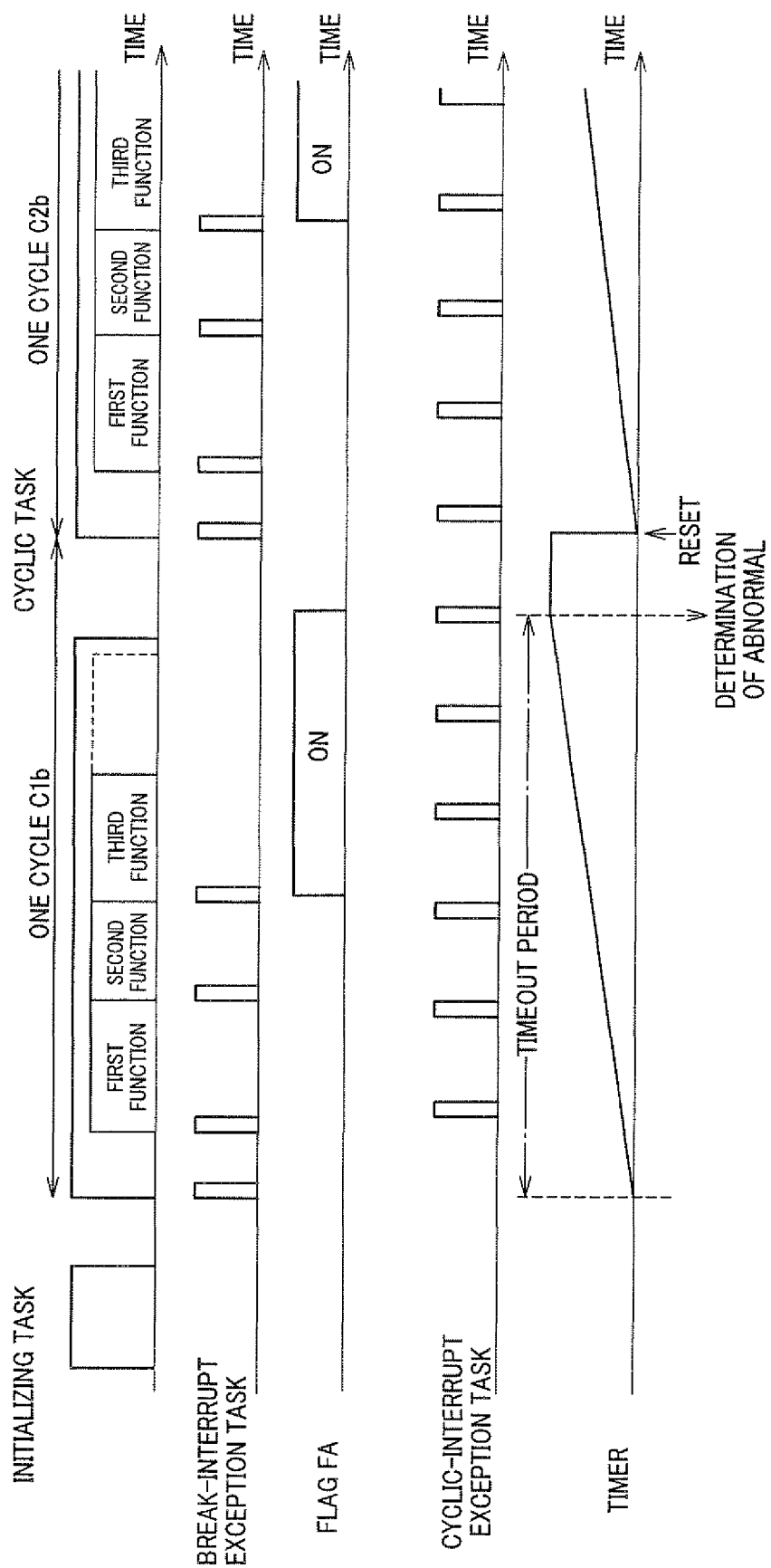
FIG. 15 is a timing chart schematically illustrates, when the determining routine is abnormally carried out, a relationship between the execution timing of each function in the target program, the execution timing of each break-interrupt exception task, the value of the flag set in the CPU, the timer value, and the execution timing of each cyclic-interrupt exception task according to the third embodiment.

Referring to FIG. 15, it is assumed that no determining routine is performed during one cycle C1b of the cyclic task.

In this assumption, the timeout period is preset to be longer than the time interval between the start timing of one cycle of the cyclic task and the start timing of the determining routine in the corresponding one cycle of the cyclic task and shorter than the execution period of the cyclic task. For this reason, the cyclic-interrupt exception task detects that timeout occurs before the next one cycle C2b of the cyclic task is performed, resulting in detecting the abnormality of the determining routine.

As described above, the microcomputer 10A according to the third embodiment is configured to detect skipping the determining routine independently of whether the first to N-th functions in the target program are normally carried out by the CPU 11A.

Thus, in addition to the effects achieved by the microcomputer 10 according to the first embodiment, the microcomputer 10A according to the third embodiment achieves an effect of more reliably carrying out the test of the target program. In other words, if a part of the first to N-th functions in the target program is not carried out so that the determining routine is not carried out, it is possible to prevent the designer or the program developer of the target program from misunderstanding that the target program is normal.

Particularly, the microcomputer 10A is configured to, even if no determining routine is performed during one cycle of the cyclic task, detect the abnormality of the determining routine before execution of the next one cycle of the cyclic task. Thus, it is possible to immediately carry out the failsafe task.

Fourth Embodiment

A microcomputer according to a fourth embodiment of the present invention will be described hereinafter. The microcomputer according to the fourth embodiment has substantially the same structure as that of the microcomputer according to the first embodiment except for some components. For this reason, like reference characters are assigned to like parts in the microcomputers according to the first and fourth embodiments so that descriptions of the parts of the microcomputer according to the fourth embodiment will be omitted or simplified.

Figure 16A:
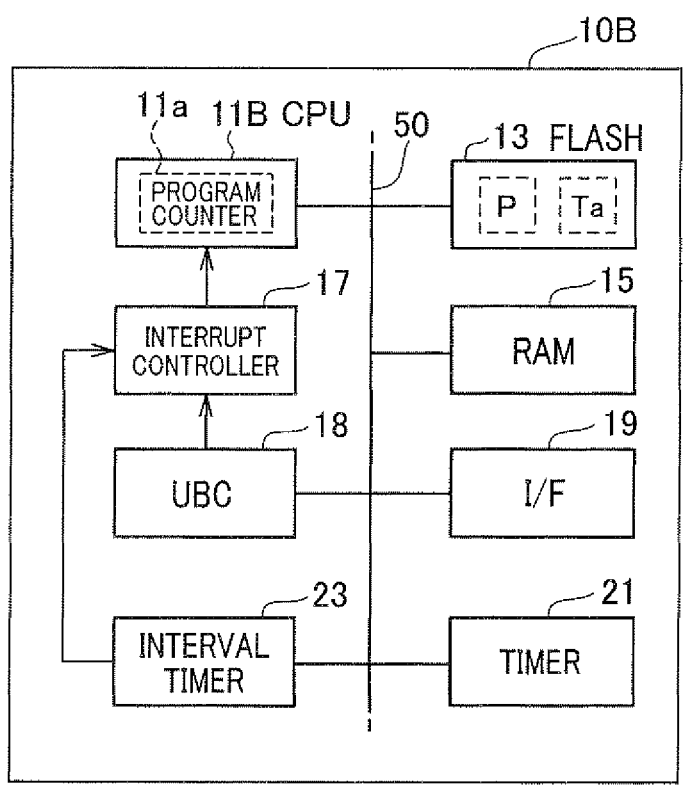
FIG. 16A is a block diagram schematically illustrating an example of the overall structure of a microcomputer according to a fourth embodiment of the present invention.

Referring to FIG. 16A, the microcomputer 10B includes the interval timer 23 described in the third embodiment in addition to the structure of the microcomputer 10 according to the first embodiment. A determining routine according to the fourth embodiment located in the target program is different from the determining routine according to the first embodiment. A cyclic-interrupt exception handler according to the fourth embodiment stored in the flash memory 13 is different from the cyclic-interrupt exception handler according to the third embodiment.

Specifically, the microcomputer 1013 according to the fourth embodiment runs the determining routine (see step S240 in FIG. 4) after the N-th function in the target program based on the flag FA to thereby determine whether the sequence of instructions in the target program is normal.

Referring to FIG. 16B, when launching the determining routine, the CPU 11B clears a count value CV of its counter to zero in step S900. This counter can be set by software in the CPU 11B, or set using one of registers in the CPU 11B. Note that an initial value of the count value CV is set to zero.

After completion of the operation in step S900, the CPU 11B executes the operations in steps S910 to S950 equivalent to the operations in steps S410 to S450 illustrated in FIG. 7, and thereafter, the CPU 11B terminates the determining routine.

Every time of receipt of the cyclic interrupt request, the CPU 11B runs the cyclic-interrupt exception handler to thereby carry out a cyclic-interrupt exception task illustrated in FIG. 16C.

When launching the cyclic-interrupt exception handler, the CPU 11B determines whether the count value CV is equal to or lower than a predetermined threshold value in step S1010.

The predetermined threshold value is preset to be slightly longer the number of counts corresponding to the execution period of the cyclic task.

Upon determining that the count value CV is equal to or lower than the predetermined threshold value YES in step S1010), the CPU 11B increments the count value CV by 1 in step S1020, terminating the cyclic-interrupt exception task.

Otherwise, upon determining that the count value CV is greater than the predetermined threshold value (NO in step S1010), the CPU 11B clears the count value CV to zero in step S1030, and sets the flag FA to OFF in step S1040. Thereafter, the CPU 11B determines that the determining routine is abnormal in step S1050. In other words, the CPU 11B determines that the determining routine has been skipped or passed out in step S1050.

Then, the CPU 11B outputs, to the flash memory 13, the interface 19, or the like, information indicative of the determining routine in the target program being abnormal in step S1060, exiting the cyclic-interrupt exception task.

As described above, the microcomputer 10B according to the fourth embodiment is configured to measure an elapsed time since execution of the determining routine (the operation in step S900) as the count value CV of the counter; this count value CV is updated every execution period of the cyclic-interrupt exception task.

Figure 16D:
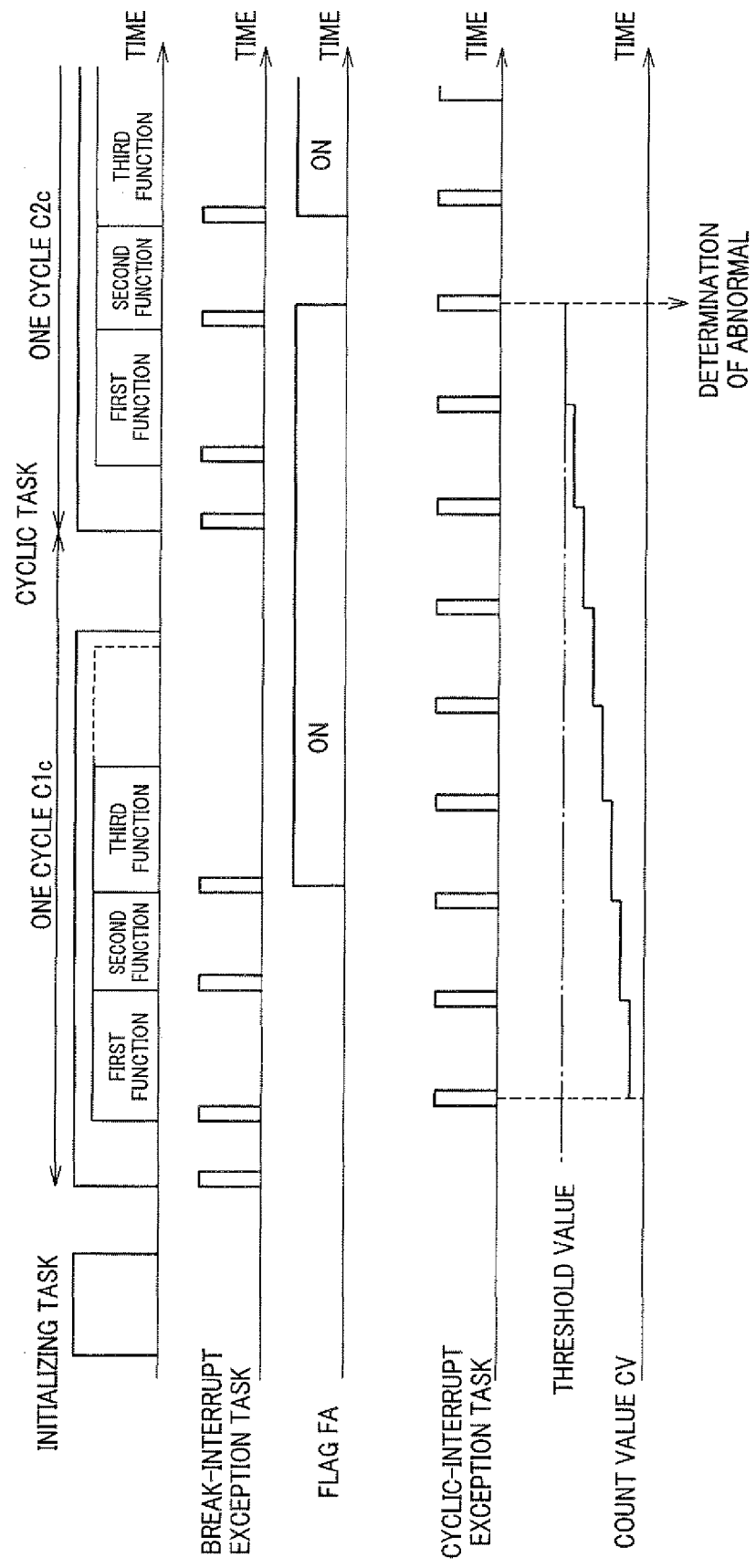
FIG. 16D is a timing chart schematically illustrates, when the determining routine is abnormally carried out, a relationship between the execution timing of each function in the target program, the execution timing of each break-interrupt exception task, the value of the flag set in the CPU, the execution timing of each cyclic-interrupt exception task, and a count value according to the fourth embodiment.

At that time, referring to FIG. 16D, it is assumed that no determining routine is performed during one cycle C1c of the cyclic task.

In this assumption, the threshold value is preset to be slightly longer the number of counts corresponding to the execution period of the cyclic task.

For this reason, the cyclic-interrupt exception task detects that the count value CV is greater than the threshold value slightly after completion of the one cycle C1c of the cyclic task, resulting in detecting the abnormality of the determining routine.

As described above, the microcomputer 10B according to the fourth embodiment is configured to detect skipping the determining routine independently of whether the first to N-th functions in the target program are normally carried out by the CPU 11B.

Thus, in addition to the effects achieved by the microcomputer 10 according to the first embodiment, the microcomputer 10B according to the forth embodiment achieves an effect of more reliably carrying out the test of the target program. In other words, if a part of the first to N-th functions in the target program is not carried out so that the determining routine is not carried out, it is possible to prevent the designer or the program developer of the target program from misunderstanding that the target program is normal.

Fifth Embodiment

A microcomputer according to a fifth embodiment of the present invention will be described hereinafter. The microcomputer according to the fifth embodiment has substantially the same structure as that of the microcomputer according to the first embodiment except for some components. For this reason, like reference characters are assigned to like parts in the microcomputers according to the first and fifth embodiments so that descriptions of the parts of the microcomputer according to the fifth embodiment will be omitted or simplified.

Figure 17:
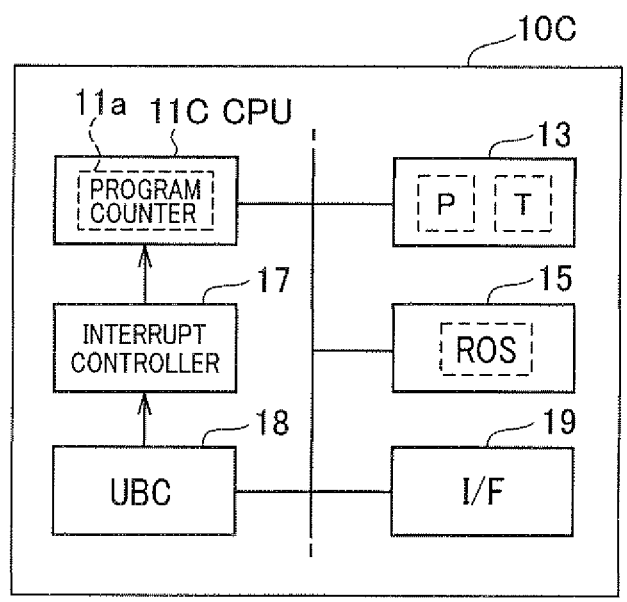
FIG. 17 is a block diagram schematically illustrating an example of the overall structure of a microcomputer according to a fifth embodiment of the present invention.

Referring to FIG. 17, a real time operating system RTOS is loaded in the RAM 15. A CPU 11C of the microcomputer 10C is configured to execute various tasks based on the various programs P in a predetermined schedule.

A break-interrupt exception handler according to the fifth embodiment stored in the flash memory 13 as one of the programs P is different from the break-interrupt exception handler according to the first embodiment. A determining routine according to the fifth embodiment located in the target program is different from the determining routine according to the first embodiment.

In addition, a cyclic determination program is stored in the flash memory 13 as one of the various programs P.

In the fifth embodiment, the schedule of the various tasks is determined such that a priority of a cyclic determination task based on the cyclic determination program is lower than that of the cyclic task based on the cyclic program. In other words, the cyclic task is activated in priority higher than the cyclic determination task.

Figure 18A:
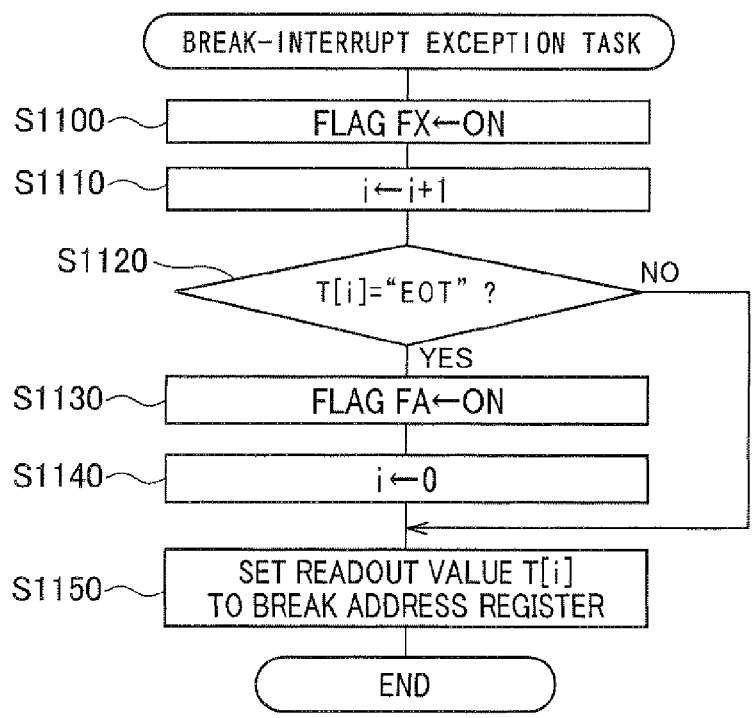
FIG. 18A is a flow chart schematically illustrating a break-interrupt exception task to be executed by the CPU according to the fifth embodiment.

Referring to FIG. 18A, every time of receipt of the break interrupt request inputted from the interrupt controller 17, the CPU 11C sets a parameter (flag) FX used as a flag to ON (1). Note that the flag FX is for example set by software in the CPU 11C in step S100. Thereafter, the CPU 11C increments the pointer "i" by 1, in other words, sets "i+1" as the pointer "i" in step S1110.

Next, the CPU 11C executes the operations in steps S1120 to S1150 equivalent to the operations in steps S320 to S350 illustrated in FIG. 5, and thereafter, the CPU 11C terminates the break-interrupt exception task.

As described above, the CPU 11C is programmed to execute the break-interrupt exception task to thereby set the flag FX to ON. In addition, the CPU 11C is programmed to execute the determining routine in the target program to thereby set the flag FX OFF described hereinafter.

Specifically, the CPU 11C runs the determining routine (see step S240 in FIG. 4) after the N-th function in the target program based on the flag FA to thereby determine whether the sequence of instructions in the target program is normal.

Figure 18B:
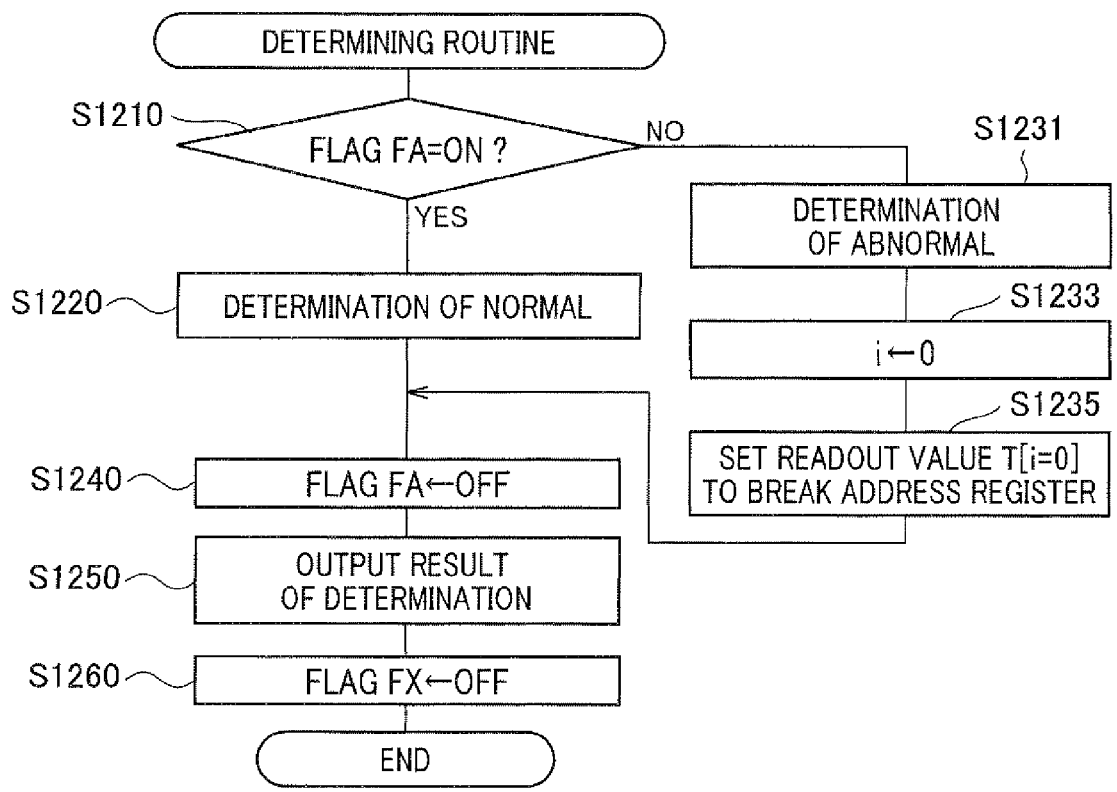
FIG. 18B is a flow chart schematically illustrating a determining routine to be executed by the CPU according to the fifth embodiment.

Referring to FIG. 18B, when launching the determining routine, the CPU 11C executes the operations in steps S1210 to S1250 equivalent to the operations in steps S410 to S450 illustrated in FIG. 7.

After completion of the operation in step S1250, the CPU 11C sets the flag FX to OFF, and thereafter, terminates the determining routine.

In the fifth embodiment, the CPU 11C is configured to carry out a cyclic determination task based on the value of the flag FX in accordance with the cyclic determination program to thereby detect skipping the determining routine.

Figure 19A:
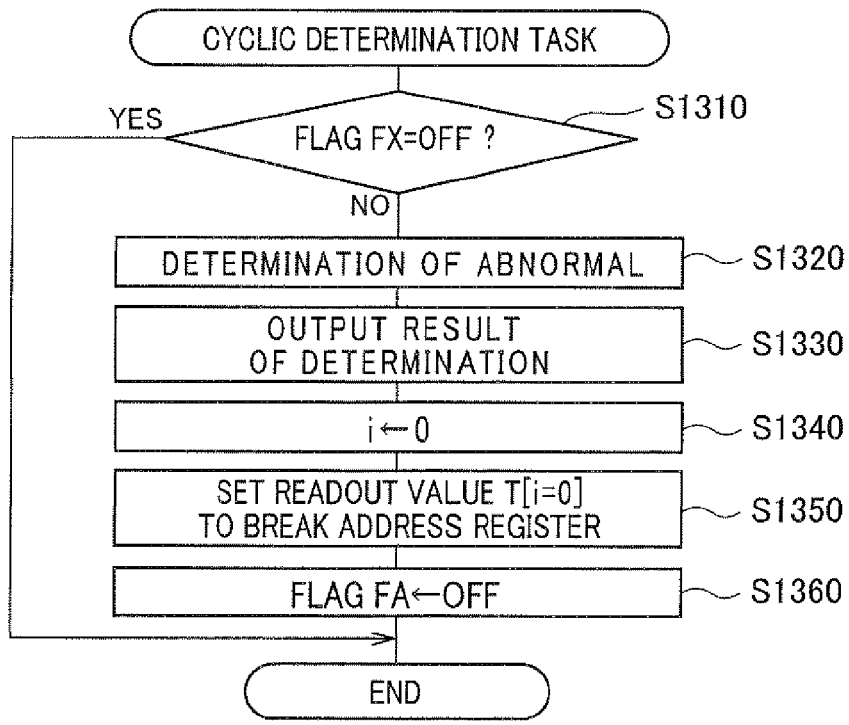
FIG. 19A is a flow chart schematically illustrating a cyclic determination task to be executed by the CPU according to the fifth embodiment.
Figure 19B:
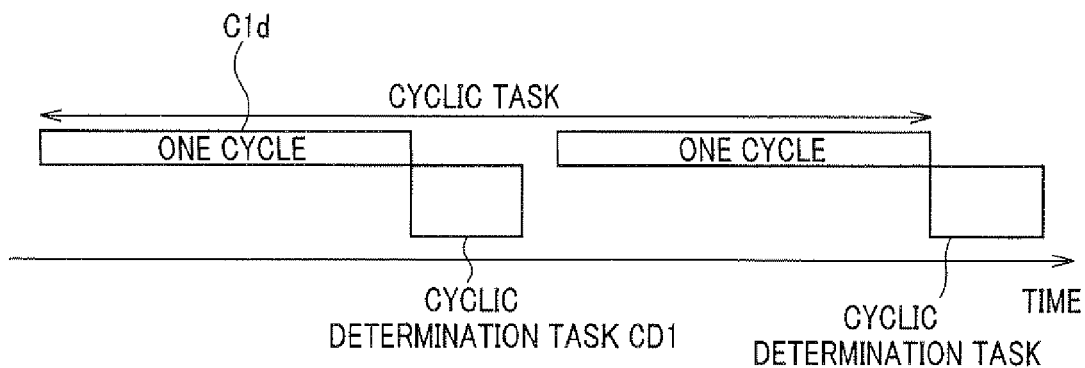
FIG. 19B is a timing chart schematically illustrates a relationship between the execution timing of each cycle of the cyclic task and that of the cyclic determination task according to the fifth embodiment.

Specifically, the microcomputer 10C is designed such that the CPU 11C periodically carries out the cyclic determination task during non-execution of the cyclic task (see FIG. 19B).

Referring to FIG. 19A, when launching the cyclic determination program, the CPU 11C determines whether the flag FX is set to OFF in step S1310.

Upon determining that the flag FX is set to OFF (YES in step S1310), the CPU 11C determines that the determining routine is normal, exiting the cyclic determination task without executing the operations in steps S1320 to S1360.

Otherwise, upon determining that the flag FX is set to ON (NO in step S1310), the CPU 11C determines that the determining routine is abnormal in step S1320, and outputs the information indicative of the determining routine being abnormal in step S1330.

In parallel with the operations in steps S1320 and S1330, the CPU 11C sets the pointer "i" to zero in step S1340. Then, the CPU 11C reads the value T[i=0] stored in the record of the address setting table T at its i-th table address, and sets the readout value T[i=0] to the break address register 18a in step S1350. Thereafter, the CPU 11C sets the flag FA to OFF in step S1360, exiting the cyclic determination task.

As described above, because the determining routine includes the operation of setting the flag FX to OFF in step S1260 (see FIG. 18B), if no determining routine is performed during one cycle C1d of the cyclic task (see FIG. 19B), the flag FX is kept ON.

At that time, the cyclic determination task CD1 after completion of the one cycle C1d of the cyclic task determines whether the flag FX is set to OFF in step S1310. For this reason, if no determining routine is performed during one cycle C1d of the cyclic task, the determination in step S1310 is NO. Thus, the operations in steps S1320 to S1330 detect skipping the determining routine.

In addition to the effects achieved by the microcomputer 10 according to the first embodiment, the microcomputer 10C according to the fifth embodiment achieves an effect of more reliably carrying out the test of the target program. In other words, if a part of the first to N-th functions in the target program is not carried out so that the determining routine is not carried out, it is possible to prevent the designer or the program developer of the target program from misunderstanding that the target program is normal.

Sixth Embodiment

A microcomputer according to a sixth embodiment of the present invention will be described hereinafter. The microcomputer according to the sixth embodiment has substantially the same structure as that of the microcomputer according to the first embodiment except for some components. For this reason, like reference characters are assigned to like parts in the microcomputers according to the first and sixth embodiments so that descriptions of the parts of the microcomputer according to the sixth embodiment will be omitted or simplified.

Figure 20A:
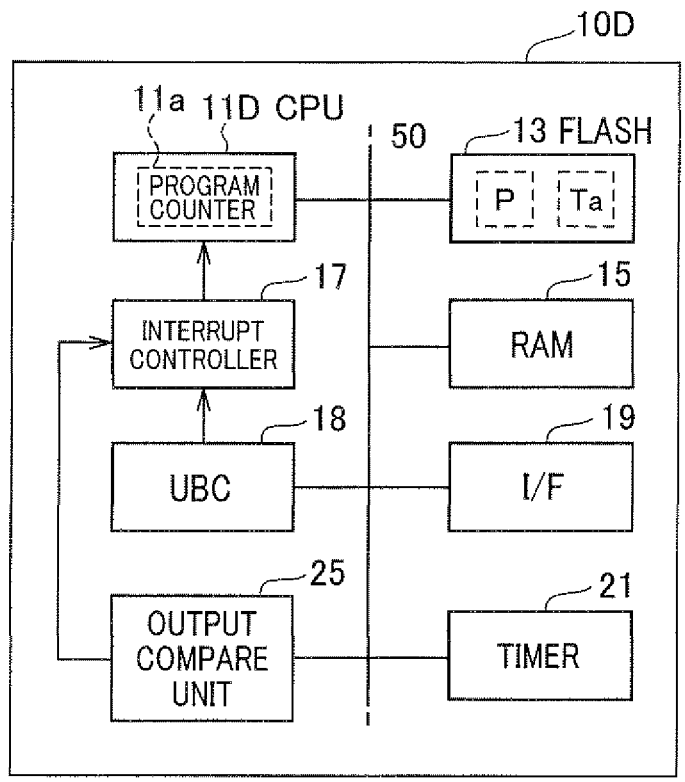
FIG. 20A is a block diagram schematically illustrating an example of the overall structure of a microcomputer according to a sixth embodiment of the present invention.

Referring to FIG. 20A, the microcomputer 10D according to the sixth embodiment includes an output compare unit 25 and the timer 21 described in the third embodiment. The flash memory 13 stores therein the address setting table Ta described in the third embodiment and illustrated in FIG. 10B.

A break-interrupt exception handler according to the sixth embodiment stored in the flash memory 13 as one of the programs P is different from the break-interrupt exception handler according to the first embodiment. A determining routine according to the sixth embodiment located in the target program is different from the determining routine according to the first embodiment.

In addition, an overflow-interrupt exception handler is stored in the flash memory 13 as one of the various programs P. Into the overflow-interrupt exception handler, an alternative routine corresponding to each of the first to N-th functions and the determining routine is incorporated.

Figure 20B:
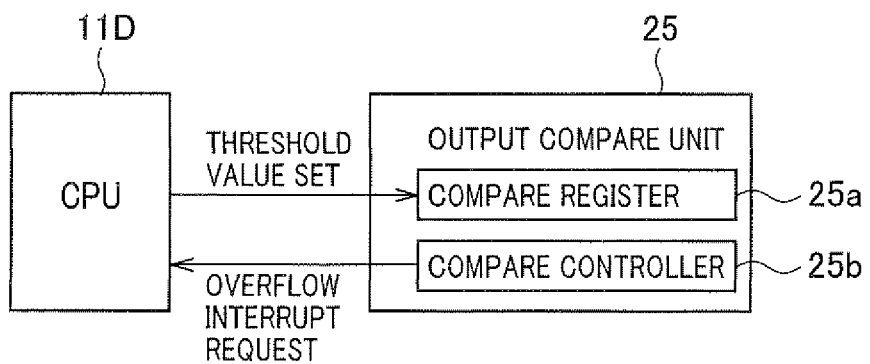
FIG. 20B is a block diagram schematically illustrating an example of the structure of an output compare unit illustrated in FIG. 20A according to the fifth embodiment.

Referring to FIG. 20B, the output compare unit 25 is integrated with a compare register 25a and a compare controller 25b. For example, to the compare register 25a, a predetermined threshold value for each of the functions and the determining routine in the target program is set.

The compare controller 25b works to:
monitor the timer value TM of the timer 21;
compare the monitored timer value TM with the threshold value set to the compare register 25a; and
output, to the CPU 11D via the break interrupt controller 17, an overflow interrupt request when it is determined that the monitored timer value TM exceeds the threshold value.

The output compare unit 25 can be designed by a hardware device or a software module installed in the microcomputer 10D.

Every time of receipt of the break interrupt request inputted from the interrupt controller 17, the CPU 11D runs the break-interrupt exception handler stored in the flash memory 13 to thereby carry out a break-interrupt exception task according to the sixth embodiment illustrated in FIG. 21A.

Referring to FIG. 21A, when launching the break-interrupt exception handler, the CPU 11D resets the timer value TM to zero, and sets the threshold value corresponding to the i-th function to the compare register 25a in step S1400, and increments the pointer "i" by 1 in step S1410. Next, the CPU 11D reads the value T[i] stored in the record of the address setting table Ta at its i-th table address. Then, the CPU 11D determines whether the readout value T[i] is equal to the code "EOT" in step S1420.

Upon determining that the readout value T[i] is not equal to the code "EOT" (NO in step S1420), the CPU 11D proceeds to step S1450. In step S1450, the CPU 11D sets the readout value T[i] to the break address register 18a. Thereafter, the CPU 11D activates the timer 21 to measure an elapsed time since the activation of the timer 21 in step S1460, terminating the break-interrupt exception task.

Otherwise, upon determining that the readout value T[i] is equal to the code "EOT" (YES in step S1420), the CPU 11D initializes the pointer "i" to zero. Thereafter, the CPU 11D reads the value T[i=0] stored in the record of the address setting table Ta at its i-th table address, and sets the readout value T[i=0] to the break address register 18a in step S1450.

Thereafter, the CPU 11D activates the timer 21 to measure to measure an elapsed time since the activation of the timer 21 in step S1460, terminating the break-interrupt exception task.

Specifically, the timer 21 measures an elapsed time from zero since activation of the break-interrupt request task, in other words, a timing defined by receipt of the break interrupt request inputted from the interrupt controller 17 or generation of the break interrupt request by the interrupt controller 17.

In addition, the microcomputer 10D according to the sixth embodiment runs the determining routine (see step S240 in FIG. 10B) after the N-th function in the target program based on the flag FA to thereby determine whether the sequence of instructions in the target program is normal.

Referring to FIG. 21B, when launching the determining routine, the CPU 11D deactivates the timer 21 to thereby stop update of the timer value TM in step S1500. Thereafter, the CPU 11D determines whether the flag FA is set to ON in step S1510.

Upon determining that the flag FA is set to OFF (NO in step S1510), the CPU 11D determines that the sequence of instructions in the target program is normal in step S1520, going to step S1540. Note that, as described hereinafter, when at least one of the functions is skipped, an overflow-interrupt exception task based on the overflow-interrupt exception handler changes the flag FA from OFF to ON described hereinafter (see FIG. 22).

Otherwise, upon determining that the flag FA is set to ON YES in step S1510), the CPU 11D determines that the sequence of instructions in the target program is abnormal in step S1531. Then, the CPU 11D sets the flag FA to OFF in step S1533, proceeding to step S1540.

In step S1540, the CPU 11D determines whether the pointer "i" is set to zero. Upon determining that the pointer "i" is set to zero (YES in step S1540), the CPU 11D proceeds to step S1550 without executing the operations in steps S1543 and S1547.

Otherwise, upon determining that the pointer "i" is not set to zero (NO in step S1540), the CPU 11D initializes the pointer "i" to zero in step S1543. Next, the CPU 11D reads the value T[i=0] stored in the record of the address setting table Ta at its i-th table address, and sets the readout value T[i=0] to the break address register 18a in step S1547, proceeding to step S1550.

In step S1550, the CPU 11D outputs, to the flash memory 13, the interface 19, or the like, information indicative of the result of determination in step S1520 or S1531.

Specifically, upon determining that the sequence of instructions in the target program is normal in step S1520, the CPU 11D outputs the information representing that the sequence of instructions in the target program is normal. Otherwise, upon determining that the sequence of instructions in the target program is abnormal in step S1531, the CPU 11D outputs the information representing that the sequence of instructions in the target program is abnormal.

Figure 22:
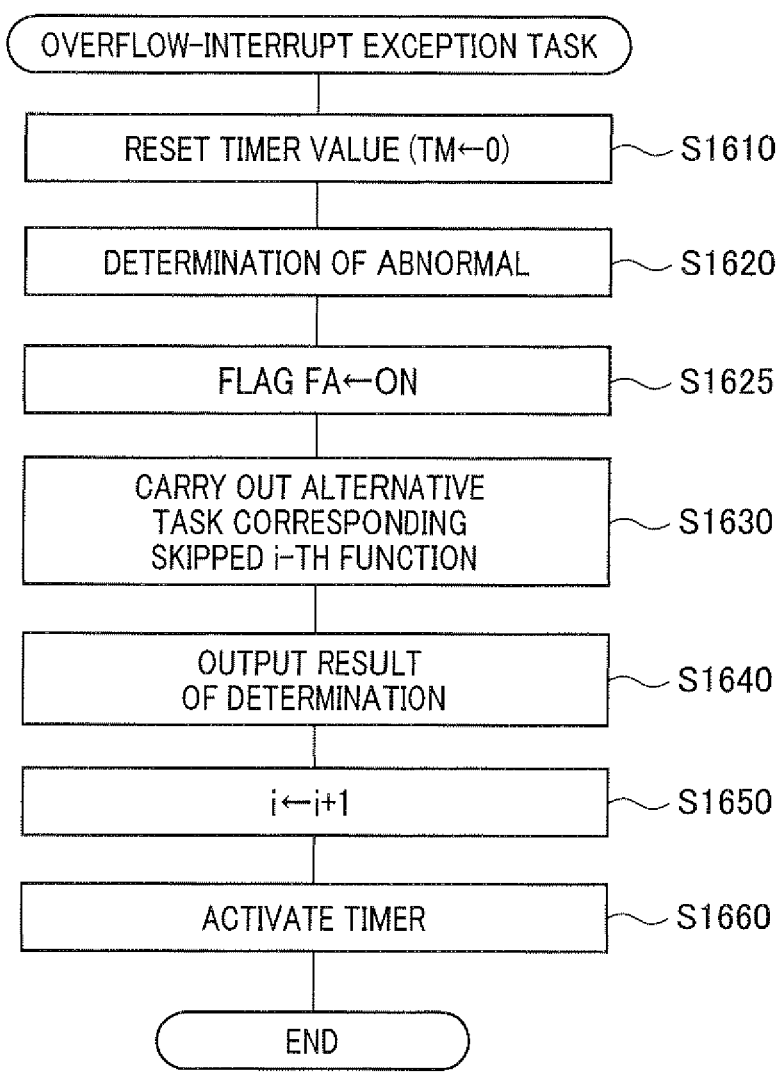
FIG. 22 is a flow chart schematically illustrating an overflow-interrupt exception task to be executed by the CPU according to the sixth embodiment.

In addition, every time of receipt of the overflow interrupt request inputted from the interrupt break controller 17, the CPU 11D runs the overflow-interrupt exception handler to thereby carry out the overflow-interrupt exception task illustrated in FIG. 22.

Referring to FIG. 22, when launching the overflow-interrupt task, the CPU 11D deactivates the timer 21 and resets the timer value TM to zero in step S1610.

After completion of the operation in step S6110 the CPU 11D determines that the i-th function corresponding to the i-th table address is not executed by the CPU 11D in step S1620, and sets the flag FA to ON in step S1625.

Next, the CPU 11D executes the alternative routine corresponding to the i-th function in step S1630. For example, the CPU 11D executes, as the alternative routine corresponding to the i-th function, a failsafe task in place of the i-th function. The CPU 11D can execute the alternative routine corresponding to the i-th function to thereby set a default value to a variable returned by the i-th function.

After completion of the operation in step S1630, the CPU 11D outputs, to the flash memory 13, the interface 19, or the like, information indicative of the result of determination in step S1620. Specifically, the CPU 11D outputs, as the information indicative of the result of determination in step S1620, the sequence of instructions in the target program being abnormal in step S1640. Thereafter, the CPU 11D increments the pointer "i" by 1 in step S1650, and activates the timer 21 to measure an elapsed time since the activation of the timer 21, terminating the overflow interrupt task.

Note that, in step S1620, when the pointer "i" is set to zero, the CPU 11D determines that skipping the determining routine, and executes the alternative routine corresponding to the determining routine in step S1630. Thereafter, the CPU 11D skips the operation in step S1650, and activates the timer 21 with the pointer air being set to zero. After completion of the overflow interrupt task when the pointer "i" is set to zero, if a new overflow interrupt request is generated, the CPU 11D determines that the cyclic task is abnormal, to thereby carry out a failsafe task corresponding to the cyclic task.

The threshold value for each of the parent function and the first to N-th functions is preset for the timer 21 to be slightly longer than an interval between a corresponding one function and the next function. Specifically, the threshold value for each of the parent function and first to N-th functions is preset such that:

the overflow interrupt request is outputted from the compare controller 25b during a period from the execution timing of the next-ordered function next to the function causing activating of the timer 21 until completion of execution of the next-ordered function.

Specifically, as described above, the break-interrupt exception task is designed for the CPU 11D to:

deactivate the timer 21; and set the threshold value corresponding to the i-th function to the compare register 25a.

For example, in order to detect skipping the first function, in the break-interrupt exception task executed when starting one cycle of the cyclic task (parent function), the threshold value for the parent function is set to be slightly longer than an interval between the start timing of the cyclic task (parent function) and the start timing of the first function.

Similarly, in order to detect skipping the determining routine, in the break-interrupt exception task executed when starting the N-th function, the threshold value for the N-th function is set to be slightly longer than an interval between the start timing of the N-th function and the start timing of the determining routine. This allows, when the determining routine is skipped, the overflow interrupt request to be generated during a period between the start timing of the determining routine and the start timing of the next cycle of the cyclic task.

As described above, the microcomputer 10D according to the sixth embodiment is configured to detect which function (routine) is skipped in each cycle of the cyclic task, and to execute an alternative task, such as a failsafe task, corresponding to the skipped function during a period within which the skipped function should be carried out.

Figure 23:
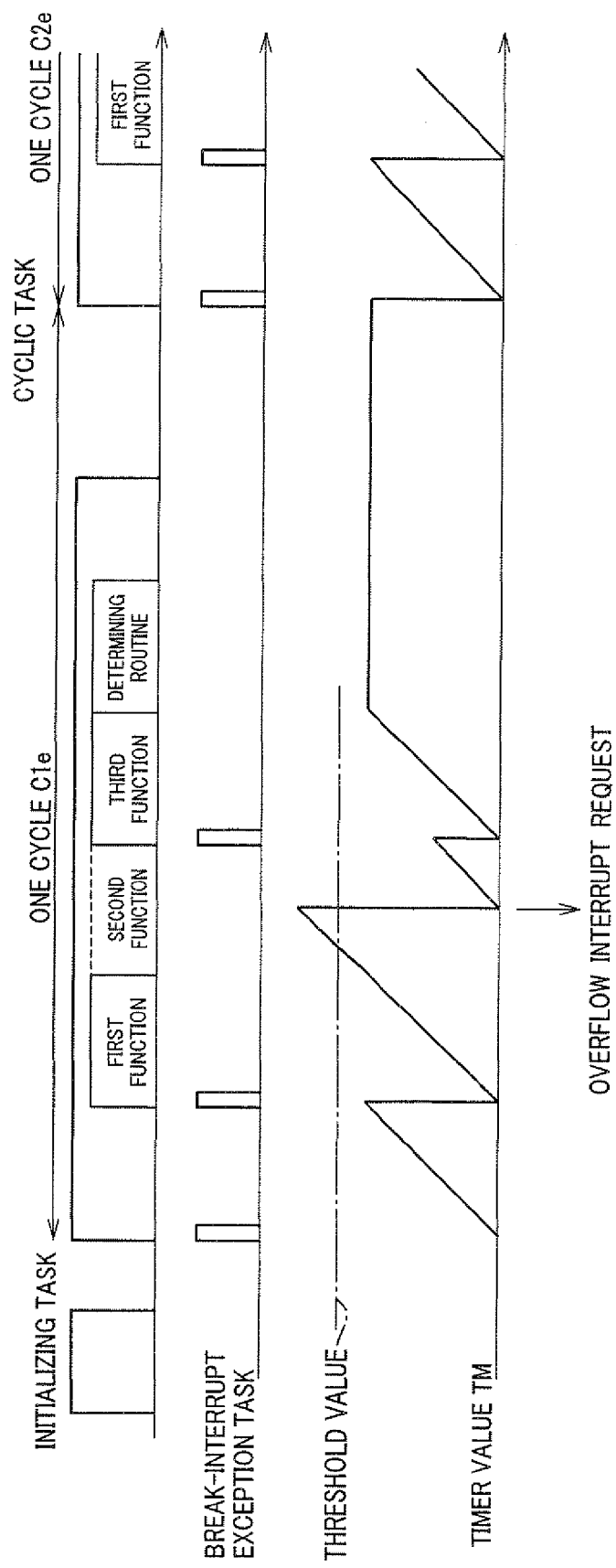
FIG. 23 is a timing chart schematically illustrates, when the second function is abnormally carried out, a relationship between the execution timing of each function in the target program, the execution timing of each break-interrupt exception task, a timer value according to the sixth embodiment.

Specifically, referring to FIG. 23, it is assumed that no second function is performed during one cycle C1e of the cyclic task so that no break interrupt request for the second function is generated.

In this assumption, in the break-interrupt exception task executed when starting the first function, the threshold value for the first function is set to be slightly longer than an interval between the start timing of the first function and the start timing of the second function.

For this reason, because no break interrupt request for the second function is generated so that no break-interrupt exception task is carried out (the operation in step S1400 is not carried out), the time value TM of the timer 21 is not reset. This results in that the timer value TM of the timer 21 exceeds the threshold value (see FIG. 23).

When the timer value TM exceeds the threshold value, the overflow interrupt request is generated by the compare controller 25b, and the generated overflow interrupt request causes the CPU 11D to carry out the overflow-interrupt exception task to thereby carry out the alternative task corresponding to the second function during a period within which the skipped second function should be carried out.

Specifically, even if any one of the first to N-th functions and the determining routine in the target program is skipped, it is possible to accurately identify the skipped function or routine, and to carry out an alternative task corresponding to the skipped function. Thus, in addition to the effects achieved by the microcomputer 10 according to the first embodiment, the microcomputer 10D according to the sixth embodiment achieves an effect of more reliably carrying out the test of the target program.

For example, a vehicle control system integrated with the microcomputer 10D can be installed in a controlled motor vehicle. In this structure, vehicle control programs are stored in the flash memory 13 as the various programs P.

In parallel with the vehicle control tasks, the microcomputer 10D is programmed to carry out the initializing task, the cyclic task, the break-interrupt exception task, and the determining routine set forth above.

In this structure, even if one of functions of one active vehicle control program as the target program is skipped for any reason, it is possible for the microcomputer 10D to carry out a failsafe task corresponding to the skipped function to thereby prevent the vehicle control from becoming unstable. This makes it possible to provide the vehicle control system with high reliability.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A test system equipped with a CPU and a user break controller integrated with a break address register and configured to generate a break interrupt request when a function corresponding to an address set to the break address register is executed, the test system testing a program to be executed by the CPU, the test system comprising:
   an address storage configured to store therein an address of each function to be executed by the CPU based on a test target program to be tested, the addresses of the functions being stored together with information of an order in which the addresses of the functions should be set in the break address register;
   an initial process unit configured to set, to the break address register, a first-ordered address in the addresses stored in the address storage;
   an address updating unit configured to use the break address register as a function updating counter by updating the address, currently set to the break address register, to the address of a function next to a function corresponding to the address currently set to the break address register when the break interrupt request is generated; and
   a determining unit configured to determine whether a sequence of instructions based on the test target program is normal based on an operation result of the address updating unit,
   wherein, when the address updating unit operates in response to execution of a last-ordered function, the determining unit determines that the sequence of the instructions is normal, and, when the address updating unit does not operate in response to execution of the last-ordered function, the determining unit determines that the sequence of the instructions is abnormal.

2. The test system according to claim 1, wherein, when the interrupt request is generated by the user break controller, the address updating unit is configured to:
   determine whether the interrupt request is generated due to the last-ordered function being executed by the CPU;
   set, to the break address register, the address of a function next to a function whose address is set to the break address register upon being determined that the interrupt request is not generated due to the last-ordered function being executed by the CPU; and
   set a determination flag to ON upon being determined that the interrupt request is generated due to the last-ordered function being executed by the CPU,
   the determining unit is configured to be activated at a timing after execution of the last-ordered function to determine that the sequence of the instructions is normal when the determination flag is set to ON, and to determine that the sequence of the instructions is abnormal when the determination flag is set to OFF, and
   the initial process unit is configured to set, to the break address register, the first-ordered address in the addresses stored in the address storage, and set the determination flag to OFF as an initial task for test.

3. The test system according to claim 1, wherein, when the interrupt request is generated by the user break controller, the address updating unit is configured to:
   determine whether the interrupt request is generated due to the last-ordered function being executed by the CPU; and set, to the break address register, a first-ordered address upon being determined that the interrupt request is generated due to the last-ordered function being executed by the CPU.

4. The test system according to claim 1, wherein the test system tests the program to be cyclically executed by the CPU as the test target program, the test system further comprising:
   a measuring unit configured to measure an elapsed time since a timing when being cleared, the determining unit being configured to clear the measuring unit upon determining whether the sequence of the instructions in the program is normal; and
   an abnormality detector configured to determine that a process of the determining unit is abnormal when the elapsed time measured by the measuring unit exceeds a preset threshold value.

5. The test system according to claim 1, wherein the test system tests the program to be cyclically executed by the CPU as the test target program, the test system further comprising:
   a measuring unit configured to measure an elapsed time since a timing when being activated, the address storage storing, based on an address of the test target program to be frequently executed and the test target program, the address of each function to be executed, the addresses of the functions being stored together with information of an order of the addresses of the functions that should be set in the break address register, the address of the test target program being a start address in the order,
   the address updating unit being configured to:
      determine whether the interrupt request is generated due to execution of the test target program being started by the CPU; and
      activate the measuring unit upon being determined that the interrupt request is generated due to execution of the test target program being started by the CPU,
   the determining unit being configured to deactivate the measuring unit upon determining whether the sequence of the instructions in the program is normal; and
   an abnormality detector configured to determine that a process of the determining unit is abnormal when the elapsed time measured by the measuring unit exceeds a preset threshold value.

6. The test system according to claim 5, wherein the abnormality detector is configured to be activated every time a cyclic interrupt request is generated at a cycle shorter than cycle of execution of the test target program so as to determine that the process of the determining unit is abnormal when the elapsed time measured by the measuring unit exceeds the preset threshold value.

7. The test system according to claim 1, wherein the test system tests the program to be cyclically executed by the CPU as the test target program, the address updating unit is configured to set an abnormality detecting flag for detecting an abnormality of in a process of the determining unit to ON upon being determined that the interrupt request is generated by the user break controller, and the determining unit is configured to set the abnormality detecting flag to OFF upon determining whether the sequence of the instructions based on the test target program is normal, the test system further comprising:
   an abnormality detector that is configured to be repetitively activated, within a period during which the test target program is not executed and which the process of the determining unit is not executed, so as to determine that:
      the process of the determining unit is normal when the abnormal detecting flag is set to OFF, and
      the process of the determining unit is abnormal when the abnormal detecting flag is set to ON.

8. The test system according to claim 7, wherein functions as the determining unit and the abnormality detector are software implemented by executing a program installed in the test system by the CPU, a task implementing the function as the abnormality detector is lower in execution priority than a task implementing a process based on the test target program and a task implementing the function as the determining unit.

9. A non-transitory computer-readable storage medium storing a program in an information processing system equipped with: a CPU; a user break controller integrated with a break address register and configured to generate a break interrupt request when a function corresponding to an address set to the break address register is executed, and an address storage that stores therein an address of each function to be executed by the CPU, the addresses of the functions being stored together with information of an order in which the addresses of the functions should be set in the break address register, the program causing the CPU to implement functions comprising:
   an initial process that sets, to the break address register, a first-ordered address in the addresses stored in the address storage;
   an address update that uses the break address register as a function updating counter by updating the address, currently set to the break address register, to the address of a function next to a function corresponding to the address currently set to the break address register when the break interrupt request is generated; and
   a determination that determines whether a sequence of instructions based on the test target program is normal based on an operation result of the address update, when the address update operates in response to execution of a last-ordered function, the determination determining that the sequence of the instructions is normal, when the address update does not operate in response to execution of the last-ordered function, the determining that the sequence of the instructions is abnormal.

* * * * *

UNITED STATES PATENT AND TRADEMARK OFFICE
CERTIFICATE OF CORRECTION

PATENT NO.        : 8,464,203 B2
APPLICATION NO.   : 12/260223
DATED             : June 11, 2013
INVENTOR(S)       : Imaeda et al.

It is certified that error appears in the above-identified patent and that said Letters Patent is hereby corrected as shown below:

On the Title Page

Item "(73) Assignee: Denso Corporation, Kariya"

Should be: --(73) Assignee: Denso Corporation, Kariya-city (JP)--

Signed and Sealed this
Fifth Day of November, 2013

Teresa Stanek Rea
*Deputy Director of the United States Patent and Trademark Office*